United States Patent [19]
Rhodes et al.

[11] Patent Number: 6,148,386
[45] Date of Patent: Nov. 14, 2000

[54] ADDRESS GENERATOR CIRCUITY FOR A CIRCULAR BUFFER

[75] Inventors: Douglas Rhodes, Long Valley, N.J.; Mark Thierbach, Allentown, Pa.

[73] Assignee: Lucent Technologies Inc, Murray Hill, N.J.

[21] Appl. No.: 09/044,529

[22] Filed: Mar. 19, 1998

[51] Int. Cl.[7] .................................................. G06F 12/06
[52] U.S. Cl. ........................... 711/200; 711/217; 711/219
[58] Field of Search .................................. 711/200, 214, 711/109, 110, 217–220; 365/73, 77, 78, 230.01, 236; 377/26, 37, 39, 111

[56] References Cited

U.S. PATENT DOCUMENTS

| | | | |
|---|---|---|---|
| 3,943,492 | 3/1976 | Gall | 713/600 |
| 4,873,667 | 10/1989 | Geadah et al. | 365/236 |
| 5,381,360 | 1/1995 | Shridhar et al. | 708/491 |
| 5,652,903 | 7/1997 | Weng et al. | 712/35 |
| 5,765,187 | 6/1998 | Shimizu et al. | 711/110 |

OTHER PUBLICATIONS

<jljackso@mail.dimensional.com> Re: Help! Strcpy()–like function that eliminates unwanted strings? News://comp.lang.c Jul. 10, 1996.

*Primary Examiner*—Eddie P. Chan
*Assistant Examiner*—Yamir Encarnacion

[57] ABSTRACT

An improved apparatus and method for providing addresses for accessing circular memory buffers is provided. An apparatus comprised of a first feedback circuit, a second feedback circuit, a beginning address register, an ending address register, and a comparator circuit. A control circuit is also provided. The beginning and ending address registers preferably include the beginning and ending addresses respectively of a circular memory buffer. The first feedback circuit is comprised of a first register, a first phase delay register, a first adder, a first displacement register, and a first multiplexer. The second feedback circuit is preferably comprised of a second register, a second phase delay register, a second adder, and a second displacement register. Preferably the control circuit based at least partially on contents of the first register, beginning address register, and ending address register, and upon a comparison by the comparison circuit between the contents of the second register and the ending address register causes either the first register or the second register contents to be supplied to an address bus.

12 Claims, 15 Drawing Sheets

Microfiche Appendix Included
(1 Microfiche, 19 Pages)

PRIOR PATENT APPLICATION

CASE 1

CASE 1

CASE 2

CASE 2

CASE 3/4

CASE 3/4

CASE 5/6

CASE 5/6

CASE 7

CASE 7

CASE 8

CASE 8

ADDRESS GENERATOR CIRCUITY FOR A CIRCULAR BUFFER

REFERENCE TO MICROFICHE APPENDIX

This application includes a microfiche appendix having 1 sheet of microfiche and a total of 19 frames.

FIELD OF THE INVENTION

This invention relates to improved methods and apparatus for providing computer memory addresses particularly addresses for use in accessing circular buffers in memory devices.

BACKGROUND OF THE INVENTION

U.S. patent application Ser. No. 08/932,977, filed on Sep. 18, 1997, to Holmqvist et al., which is incorporated by reference herein, discloses a technique for generating addresses to access a circular memory buffer. Generally speaking, this technique entails providing an address towards the beginning address of the circular buffer, incrementing that address to provide the next address, and so on until the ending address of the circular buffer is reached. Generally, the Holmqvist et al. application determines that an ending address is reached by comparing the current address with the ending address. When the ending address is reached, the technique starts over again with the beginning address. Thus in an iterative fashion addresses are provided from the beginning address to the ending address.

In Holmquist, FIG. 9, at least two feedback circuits are shown for providing the address generation. One feedback circuit comprises the address pointer register 24 and a second feedback circuit comprises an advanced address pointer register 94. The circuit has been shown in the present application as FIG. 1. These feedback circuits share an adder 40. The feedback circuit with the address pointer register 24 has a phase delay latch 96 but the feedback circuit with the advanced address pointer register 94 does not have a phase delay latch.

The technique disclosed in Holmquist has very stringent timing requirements. These timing requirements may not be met and may cause erroneous addresses to be generated. There is a need for better techniques for generating addresses for accessing circular memory buffers.

SUMMARY OF THE INVENTION

The present invention in one embodiment provides an improved method and apparatus for providing addresses for accessing computer memory, particularly circular buffer memory. The present invention improves upon devices such as disclosed in patent application Ser. No. 08/932,977, filed on Sep. 18, 1997 to Holmqvist, et al. incorporated by reference herein.

Preferably, unlike the prior art, the present invention in one embodiment, comprises first and second feedback circuits where both circuits include their own separate, different adders, displacement registers, and phase delay registers. Such components along with a different method of operation allow the present invention in one or more embodiment to provide better timing constraints.

The present invention in some embodiments provides an apparatus comprised of a first feedback circuit, a second feedback circuit, a beginning address register, an ending address register, a comparator circuit, and a control circuit. The beginning and ending address registers preferably include the beginning and ending addresses respectively of a circular memory buffer.

In the present invention the first feedback circuit is preferably comprised of a first register, a first phase delay register, a first adder, a first displacement register, and a first multiplexer. The first register has a data input port connected to a data output port of the first adder, and a data output port connected to a data input port of the first phase delay register. Preferably, the data output port of the first adder is connected to the data input port of the first register through a first data input port of a first multiplexer and a data output port of the first multiplexer. The first phase delay register also has a data output port connected to the first data input port of the first adder. The first adder has a second data input port connected to a data output port of the first displacement register. The control circuit preferably provides output signals or output data to control supplying of the data input or input signals to the first register, the status of the first multiplexer, and the value contained in the first displacement register.

In the present invention the second feedback circuit is preferably comprised of a second register, a second phase delay register, a second adder, and a second displacement register. The second register has a data input port connected to a data output port of the second adder, and a data output port connected to a data input port of the second phase delay register. The second phase delay register also has a data output port connected to the first data input port of the second adder. The second adder also has a second data input port connected to a data output port of the second displacement register.

The control circuit preferably provides output signals to control supplying of the data input port to the second register and the value contained in the first displacement register.

Preferably the control circuit based at least partially on the data output of the first register causes data at the data output port of the first register of the first feedback circuit to be supplied to an address bus during one or more first register cycles and data at the data output port of the second register of the second feedback circuit to be supplied to the address bus during one or more second register cycles.

DETAILED DESCRIPTION OF THE DRAWINGS

Prior Patent Application Circuit

Figure 1:
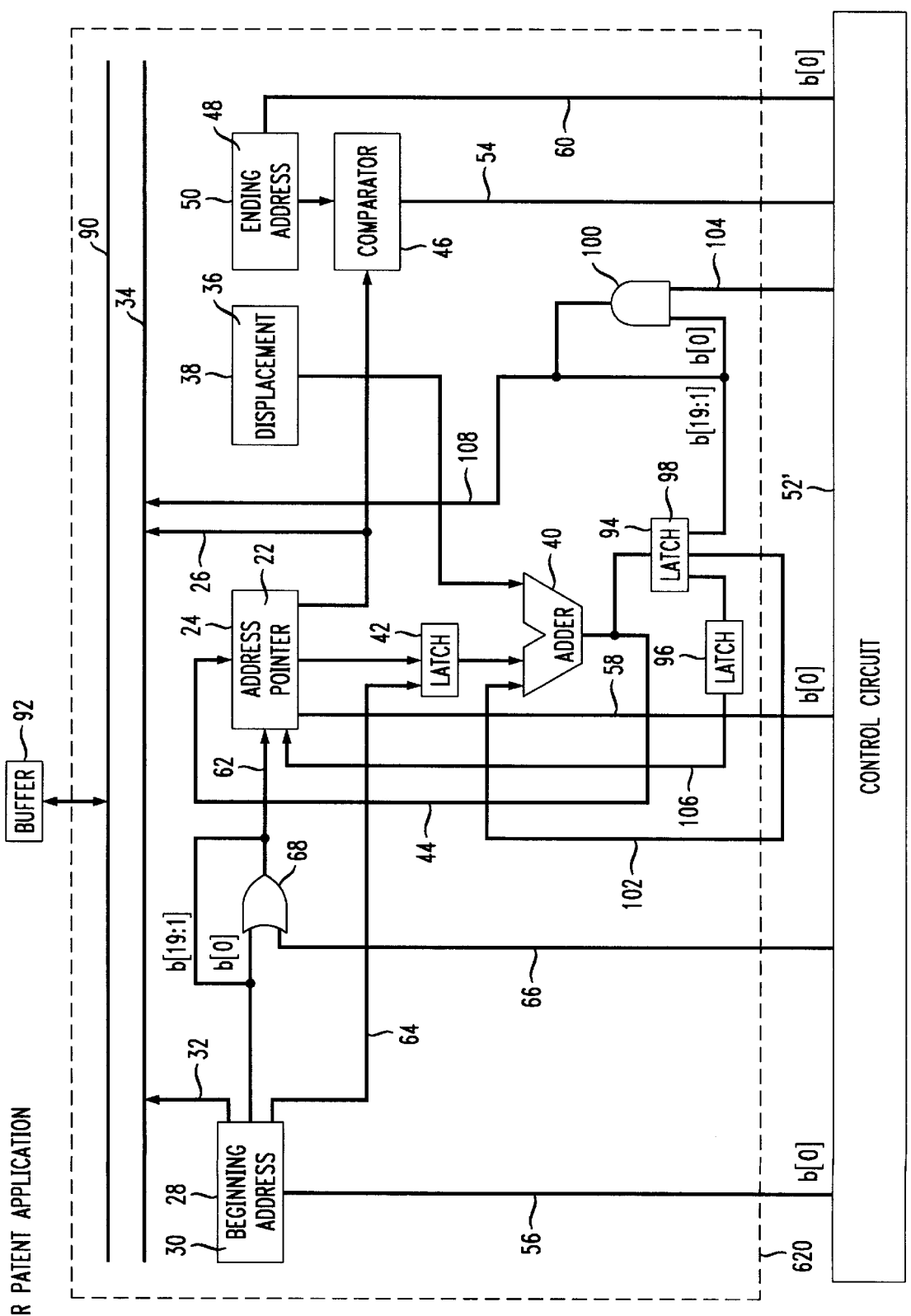
FIG. 1 shows an address generator circuit from a prior patent application.

FIG. 1 shows a technique which has been disclosed in a patent application to Holmqvist. Unlike an embodiment of the invention, the FIG. 1 circuit includes only a single adder 40, a single displacement register 36, and generally operates in a manner which is different from embodiments of the present invention.

What follows is a description taken directly from the prior patent application of FIG. 1 (FIG. 9 in the prior application):

"Upon detecting an initial double-word memory access, the misaligned fetch is executed in two cycles. The first memory access, which is a single-word access, retrieves a first word and assembles it for transmission on data bus 90. During the first memory access, the current address pointer 22 is placed on address bus 34 by way of bus 26, and displacement 36 is added to the current address pointer 22 to produce an updated address pointer. The updated address pointer is provided both to address pointer latch 24 and misalign address latch 94.

The second memory access is a double-word fetch, even though only a single word is necessary to meet the requirements of the misaligned double-word memory access being executed. The two words fetched are split with the word having a higher address stored in a temporary register or data buffer 92 for potential use in a subsequent misaligned memory access. During the second memory access, the advanced address 98 stored in misaligned address latch 94 is placed on address bus 34 by way of bus 108 with the least significant bit forced to be zero by AND gate 100. AND gate 100 receives a first input bit zero of the advanced address 98 and receives as a second input over bus 104 a signal from control circuit 52' that is a logic low at the input of AND gate 100. In this manner the output of AND gate 100 is assured to be a logic zero. The advanced address 98 with the least significant bit forced to be zero provides the memory address that is placed on bus 34 and from which data is retrieved.

Misalignment is detected by the indicator of address pointer 22 which is the least significant bit for double-word memory accesses. The word having a lower address is assembled with the data read from the previous memory access and transmitted over data bus 90. In this process, with the initial memory access to obtain the first data word in the misaligned memory access, the updated address pointer output from adder 40 is provided not only to address pointer latch 24 over bus 44 but also to a misaligned address latch 94 where it is stored. Control circuit 52' provides the updated address pointer 22 to adder 40 over bus 102 as a first input and the displacement, which is 2, to adder 40 as a second input. Adder 40 adds the inputs to provide an advanced address 98 as an output from adder 40. The advanced address 98 output is provided to misalign address latch 94 where the advanced address 98 is two greater than the address pointer 24 stored in address pointer latch 22.

On a subsequent misaligned fetch, the advanced address 98 stored in misaligned address latch 94 is placed on address bus 34 with the least significant bit forced to be zero by AND gate 100. AND gate 100 receives as a first input bit zero of the advanced address 98 and receives as a second input over bus 104 a signal from control circuit 52' that is a logic low at the input of AND gate 100. In this manner the output of AND gate 100 is assured to be a logic zero. The advanced address 98 with the least significant bit forced to be zero provides the memory address that is placed on bus 34 and from which data is retrieved. Once the advanced address 98 stored in misaligned address latch 94 has been initialized to be two greater than address pointer 22, each contiguous, subsequent misaligned double-word memory access, as controlled by control circuit 52' places advanced address 98 stored in misaligned address latch 94 on the address bus and provides advanced address 98 over bus 106 as an updated pointer 22 to address pointer latch 24 by way of race eliminating delayed misaligned address latch 96. Adder 40 receives advanced address 98 and displacement 36 as inputs and provides an output that updates advanced address pointer 98 in misaligned address latch 94 to update or maintain the advanced address pointer at two greater than the address pointer 22. In this manner, the advanced address pointer 98 value is copied to the address pointer 22, over bus 106 by way of delayed misaligned address latch 96. Only one adder is required to update both the advanced address pointer 98 and address pointer 22 because the advanced address pointer value is shifted into address pointer latch 24 as well as being placed onto address bus 34 such that only the advanced address pointer requires an addition operation to be updated."

Embodiment of the Present Invention

Figure 2A:
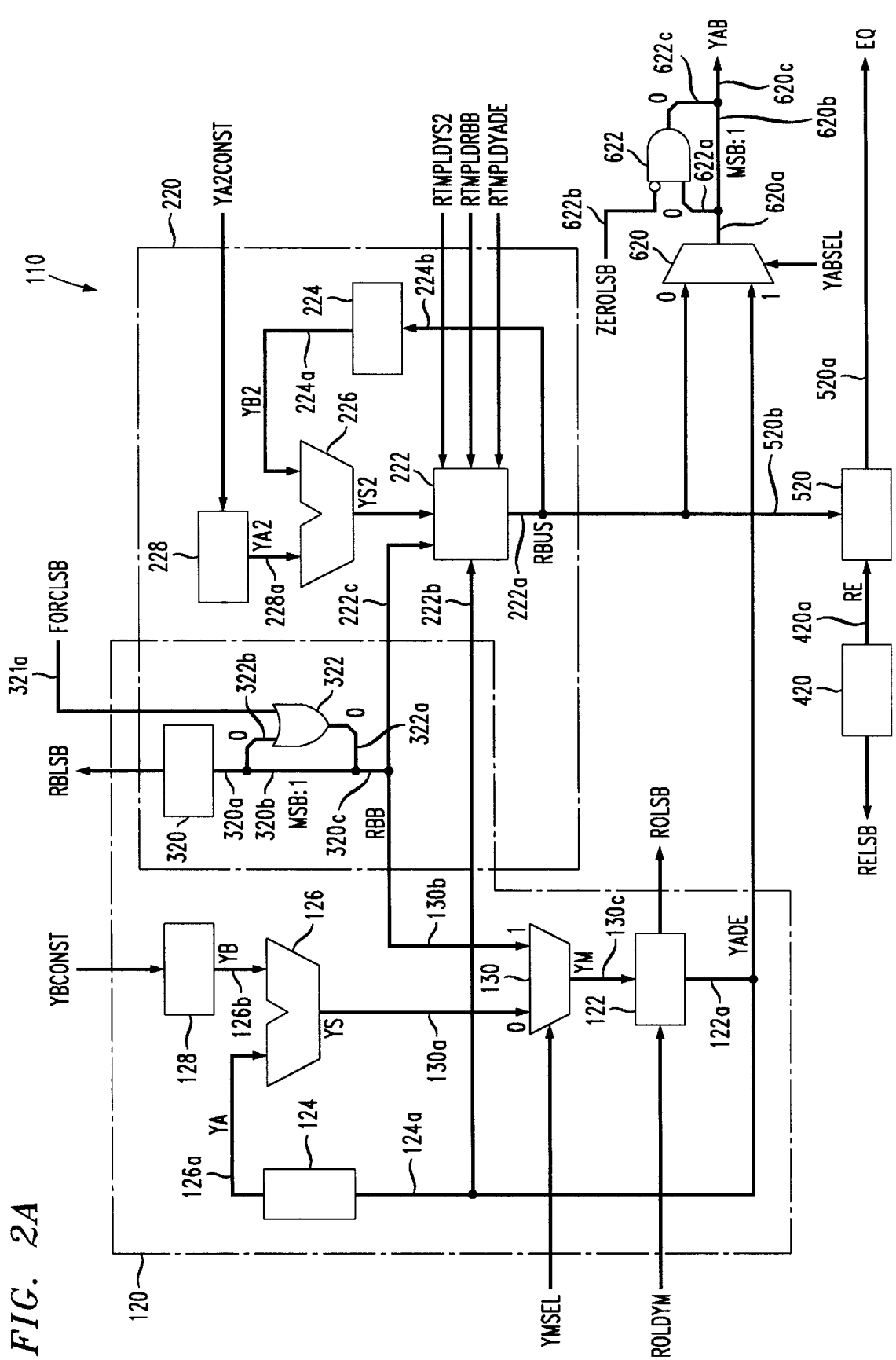
FIG. 2A shows an apparatus in accordance with an embodiment the present invention.
Figure 2B:
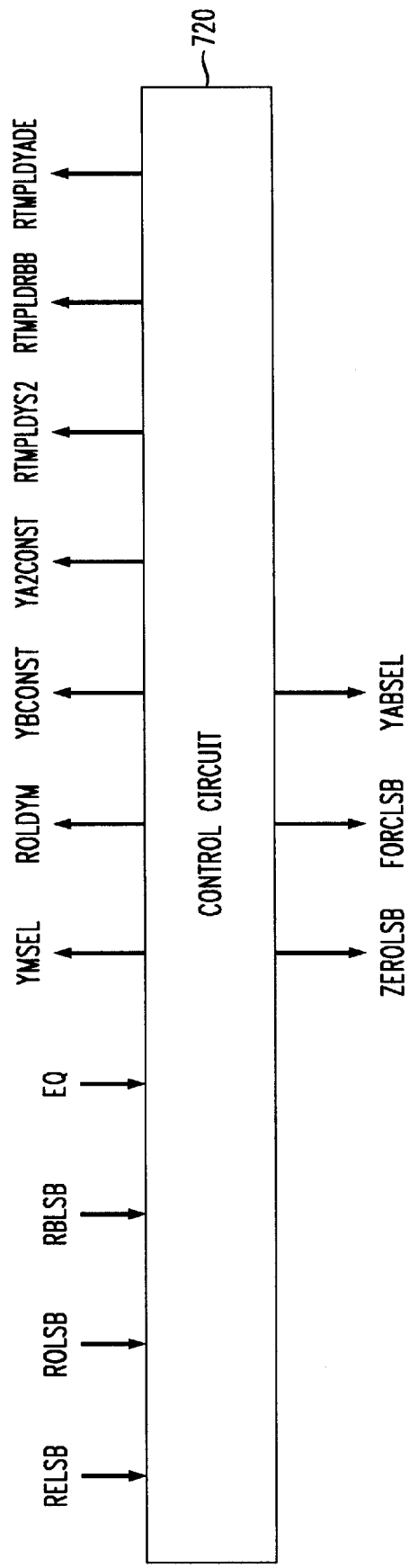
FIG. 2B shows a control circuit in accordance with an embodiment of the present invention with output and input signals.
Figure 3A:
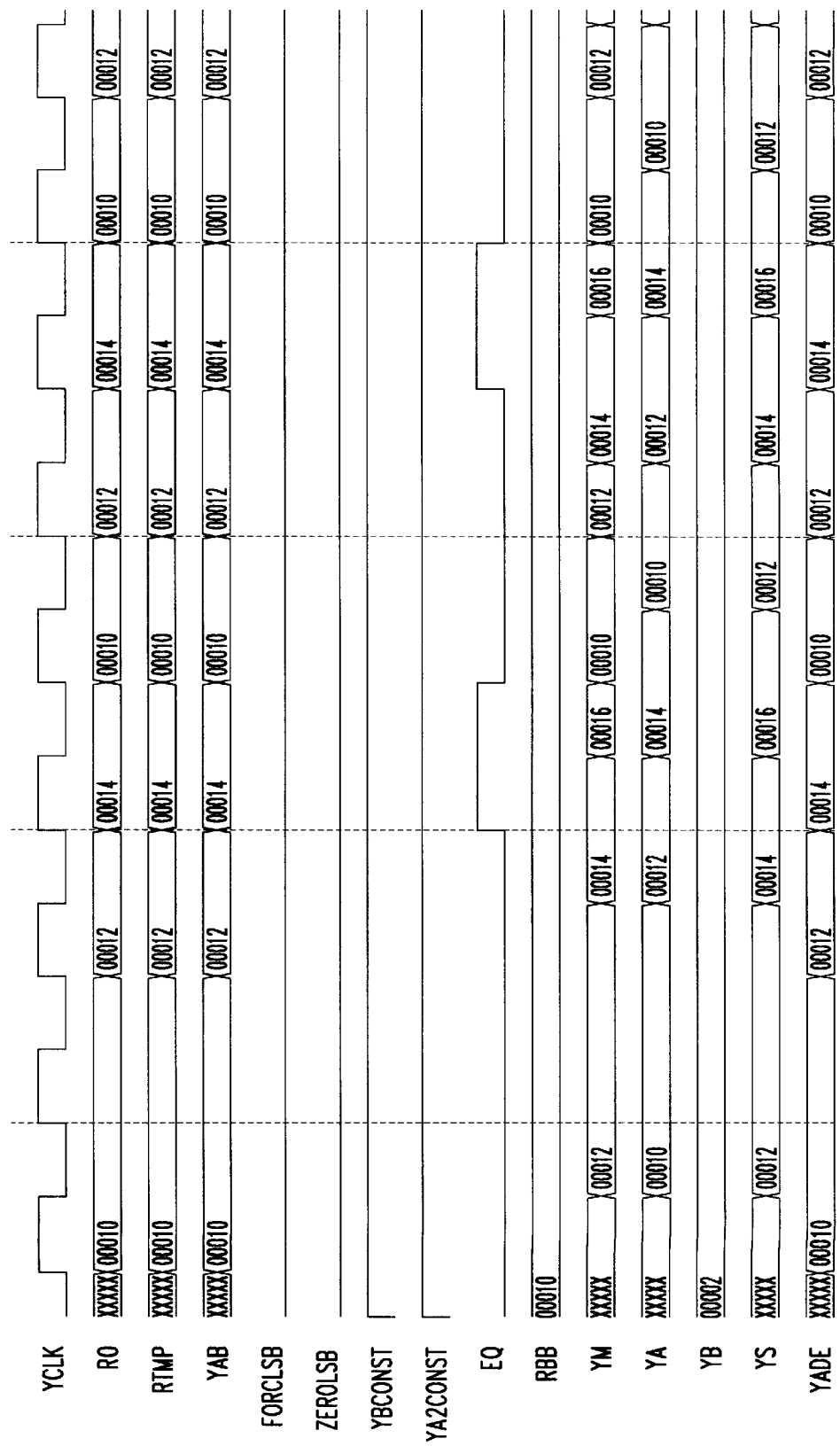
FIGS. 3A–B, 4A–B, 5A–B, 6A–B, 7A–B, and 8A–B show signal and/or data timing diagrams for cases 1, 2, 3/4, 5/6, 7, and 8 in accordance with the present invention.
Figure 3B:
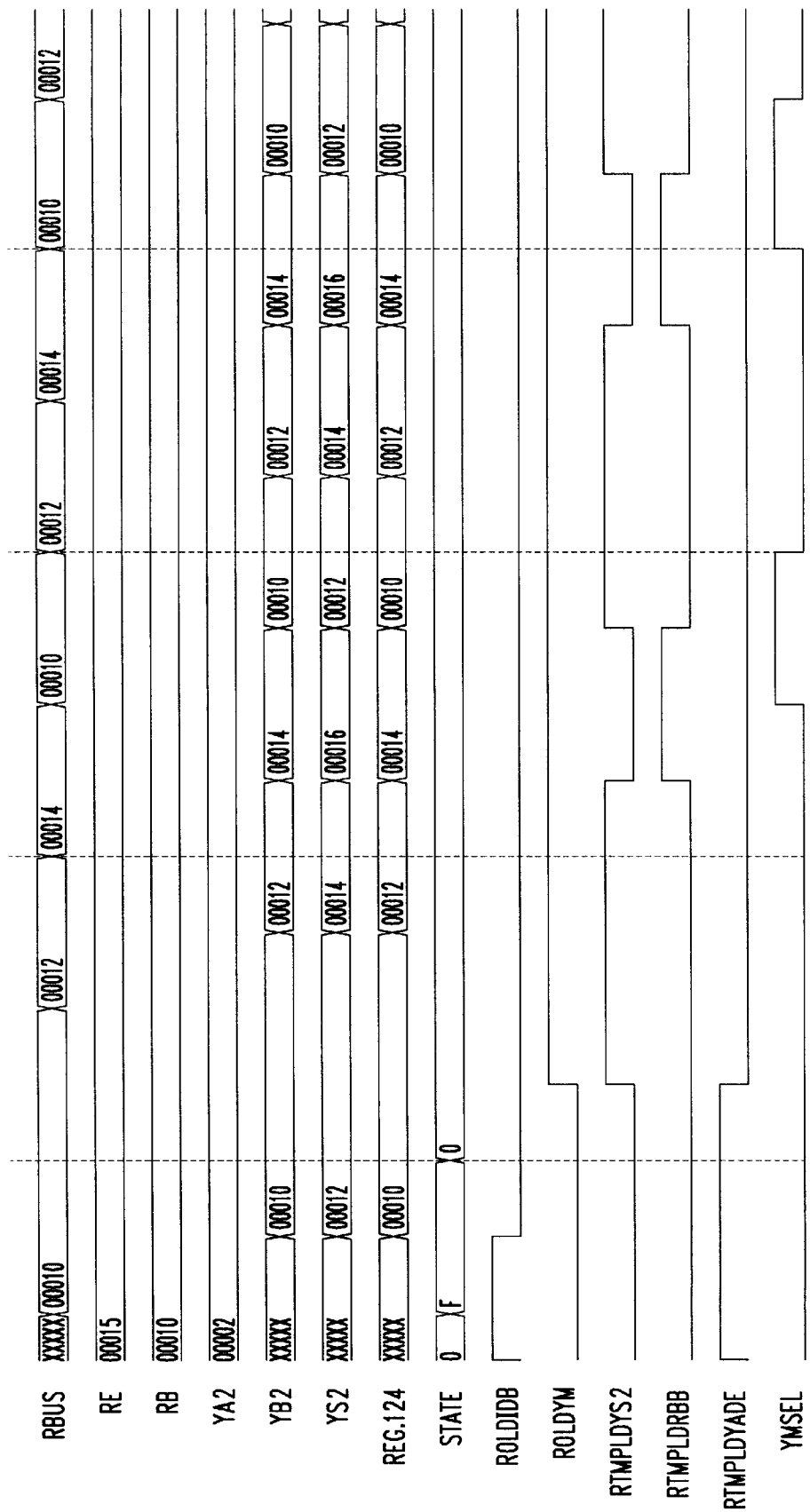
Figure 4A:
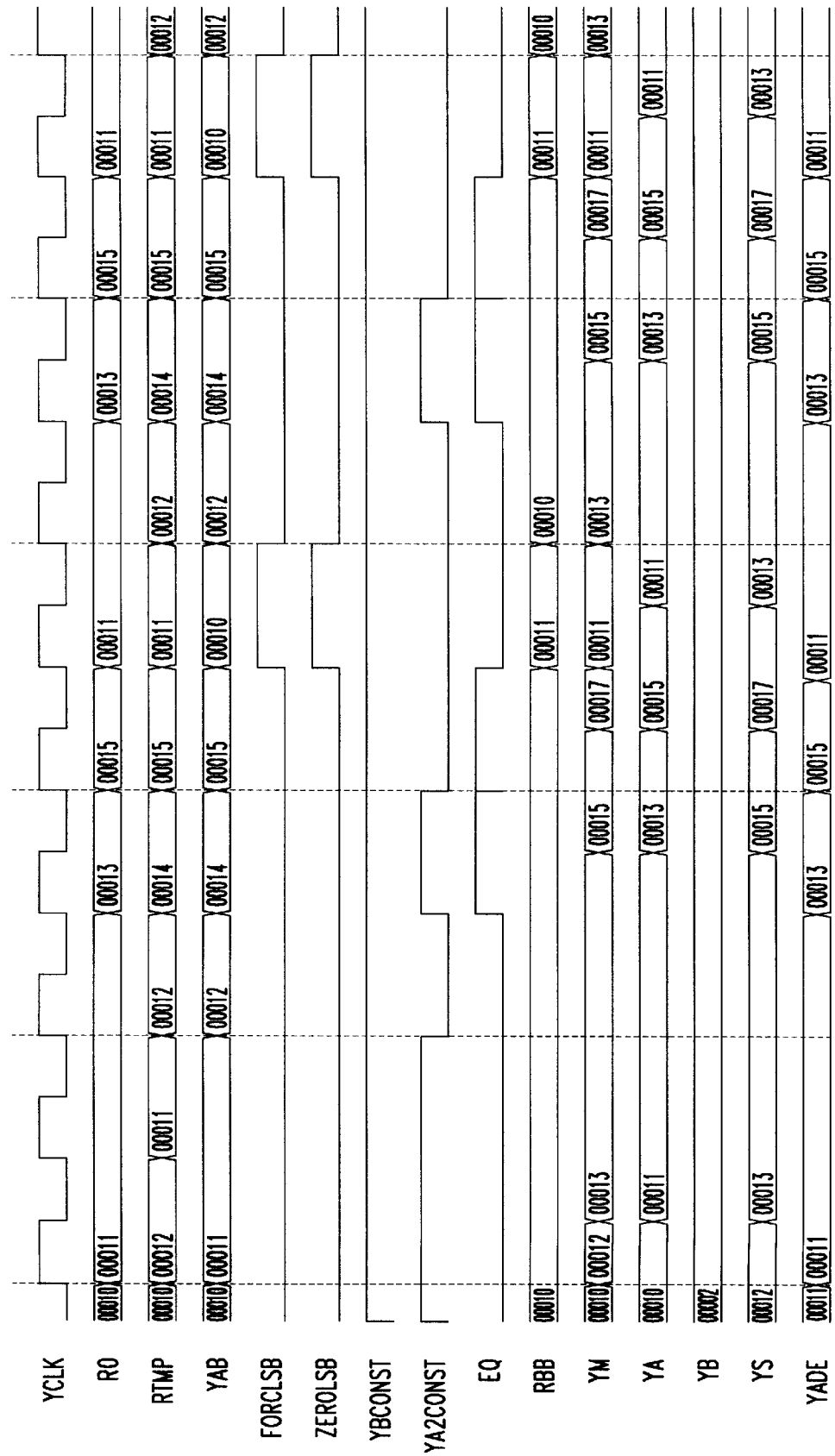
Figure 4B:
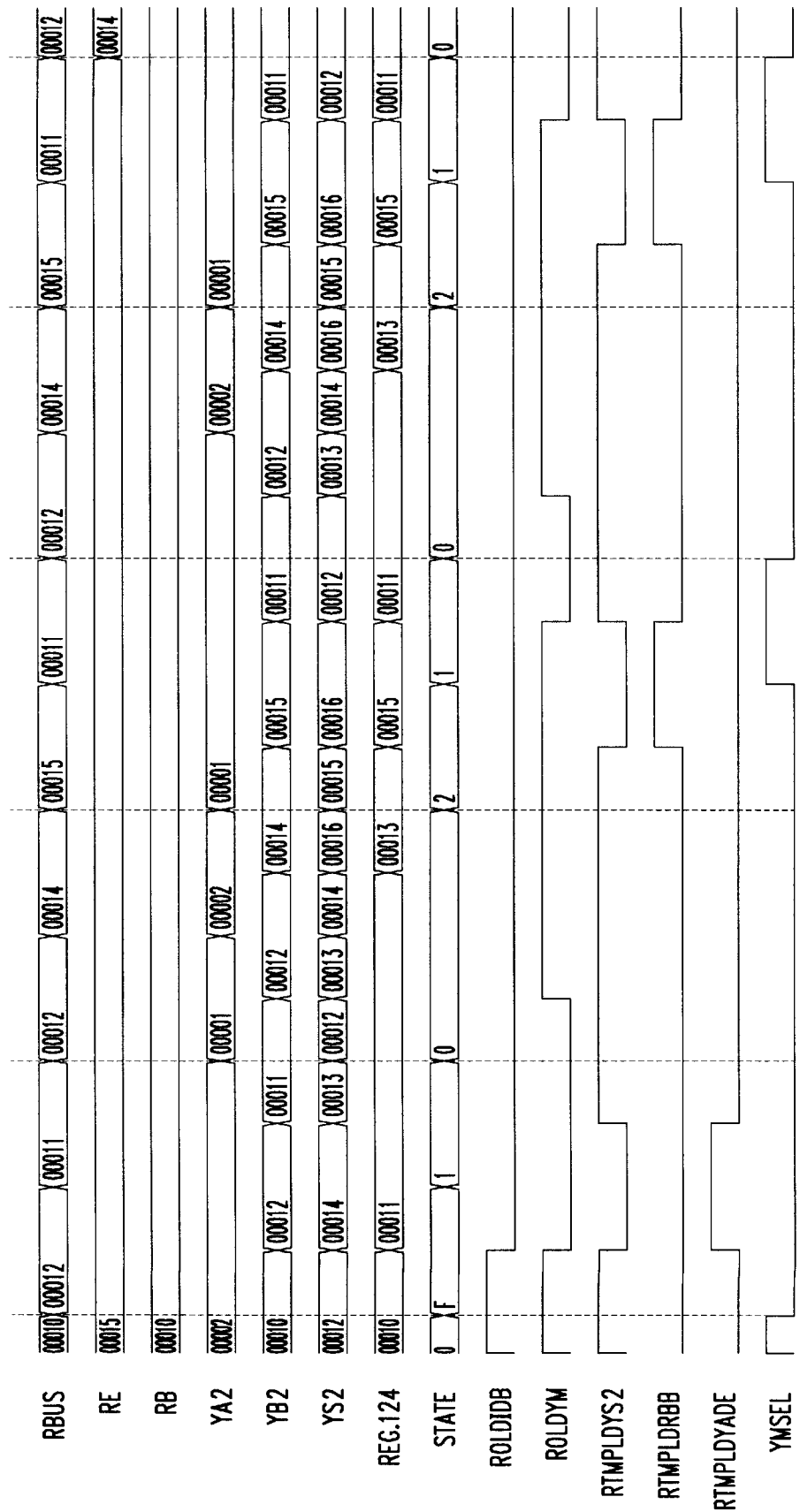
Figure 5A:
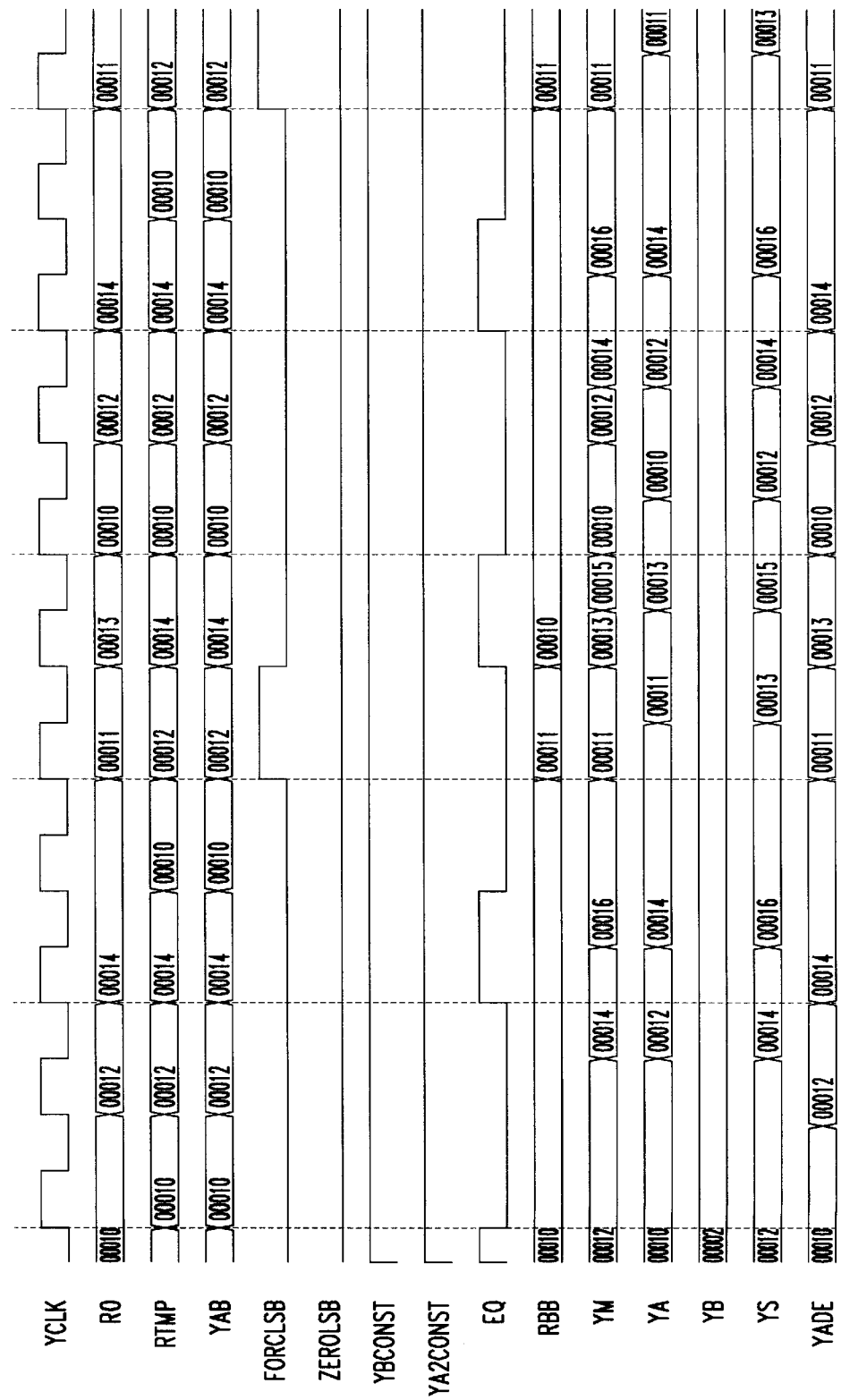
Figure 5B:
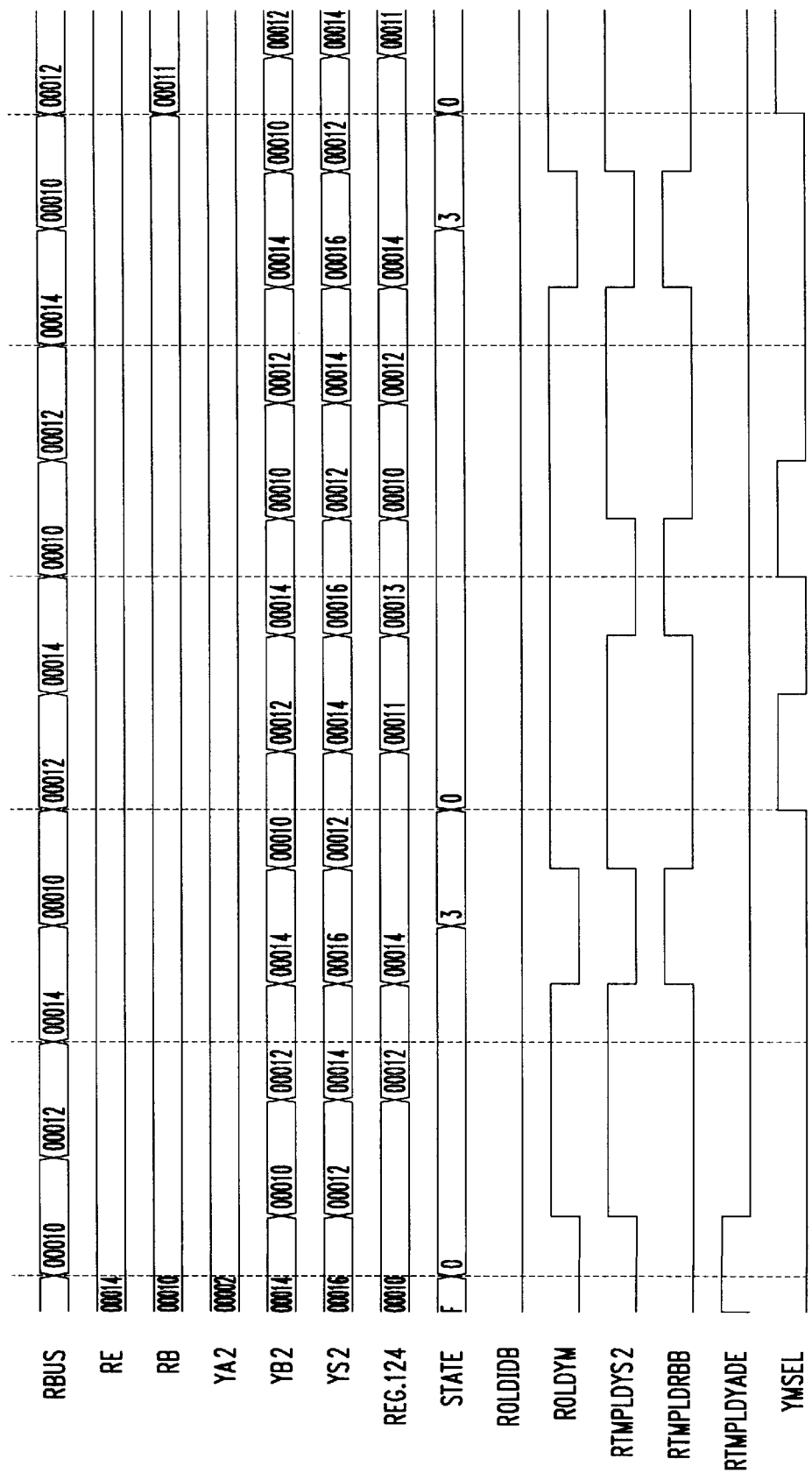
Figure 6A:
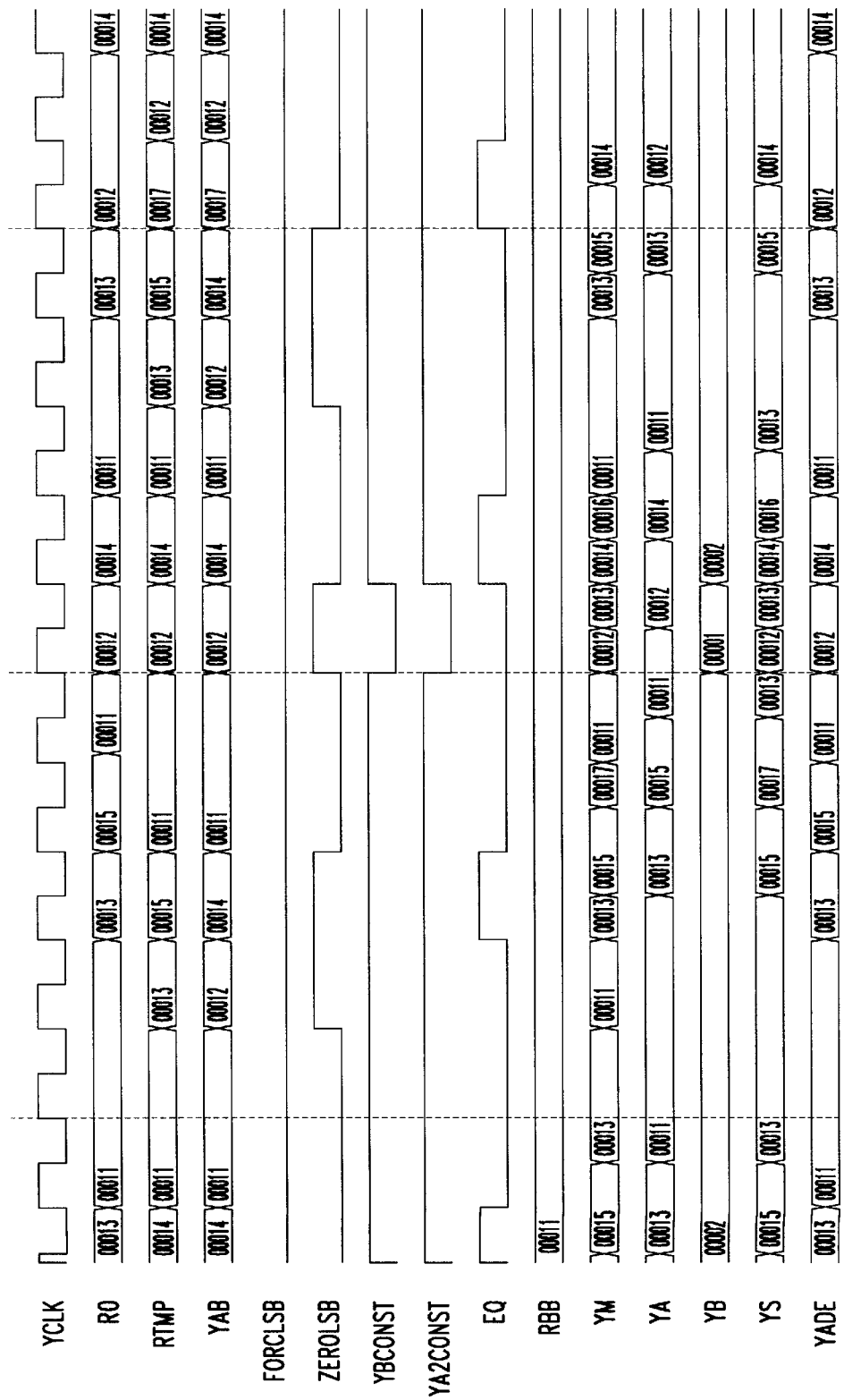
Figure 6B:
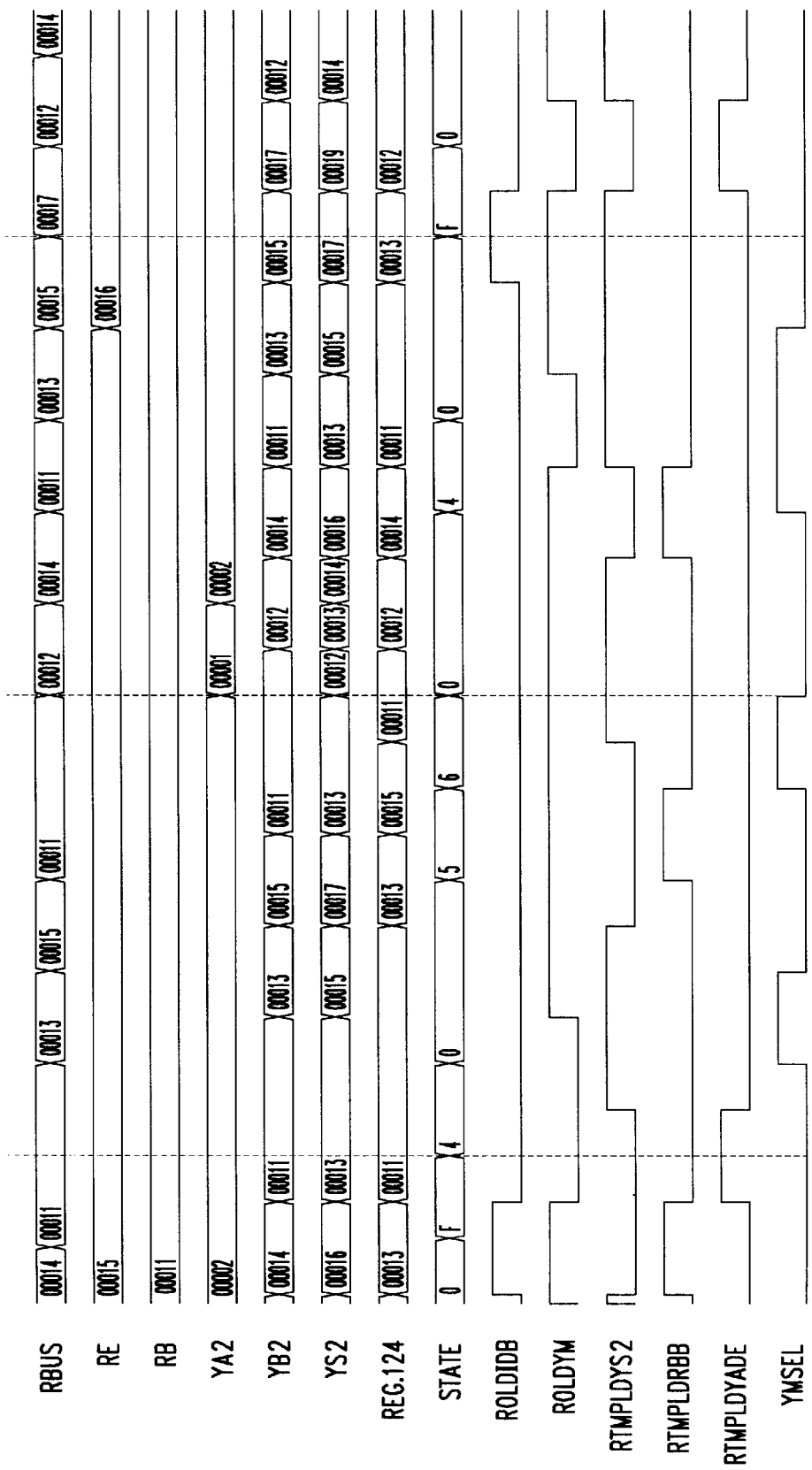
Figure 7A:
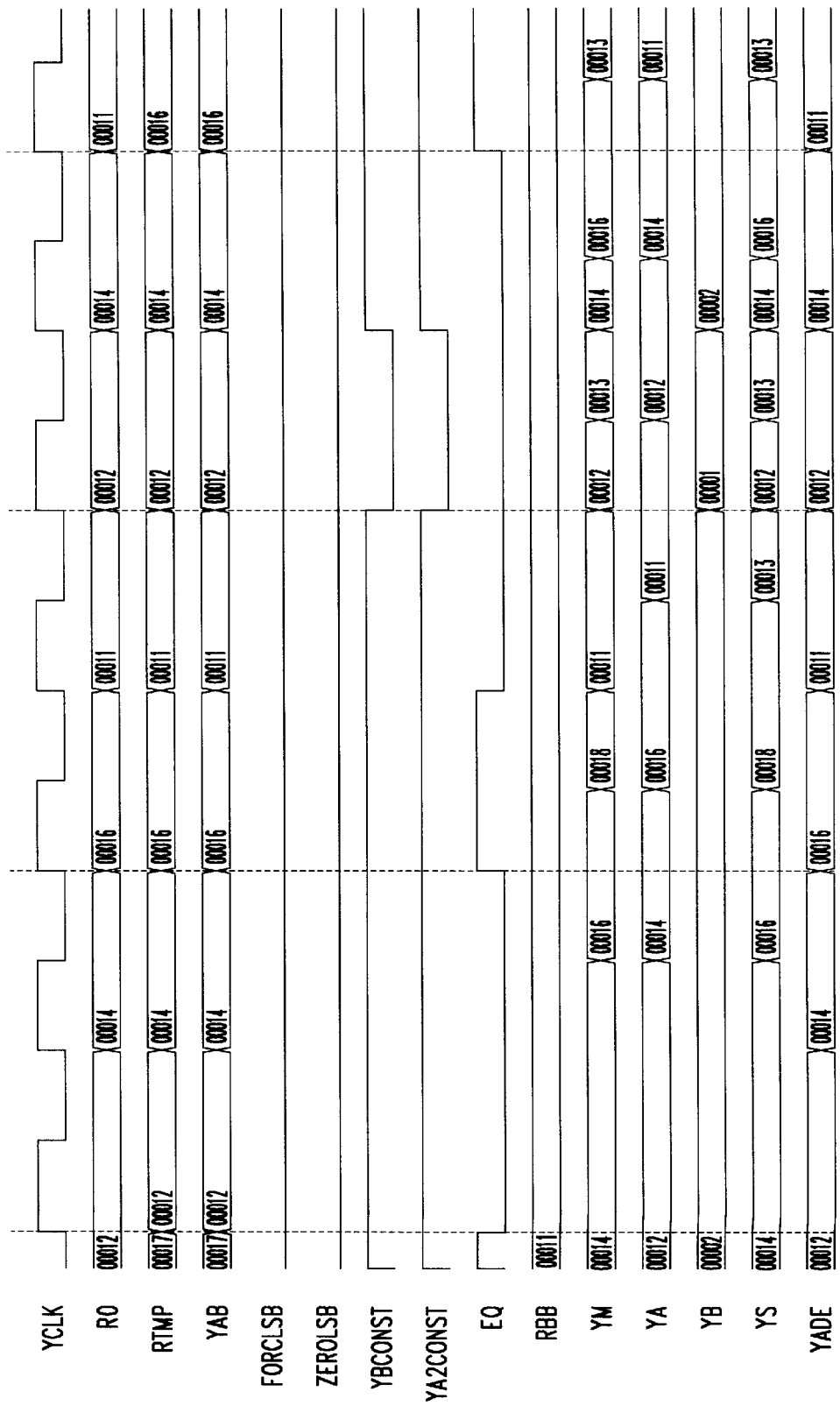
Figure 7B:
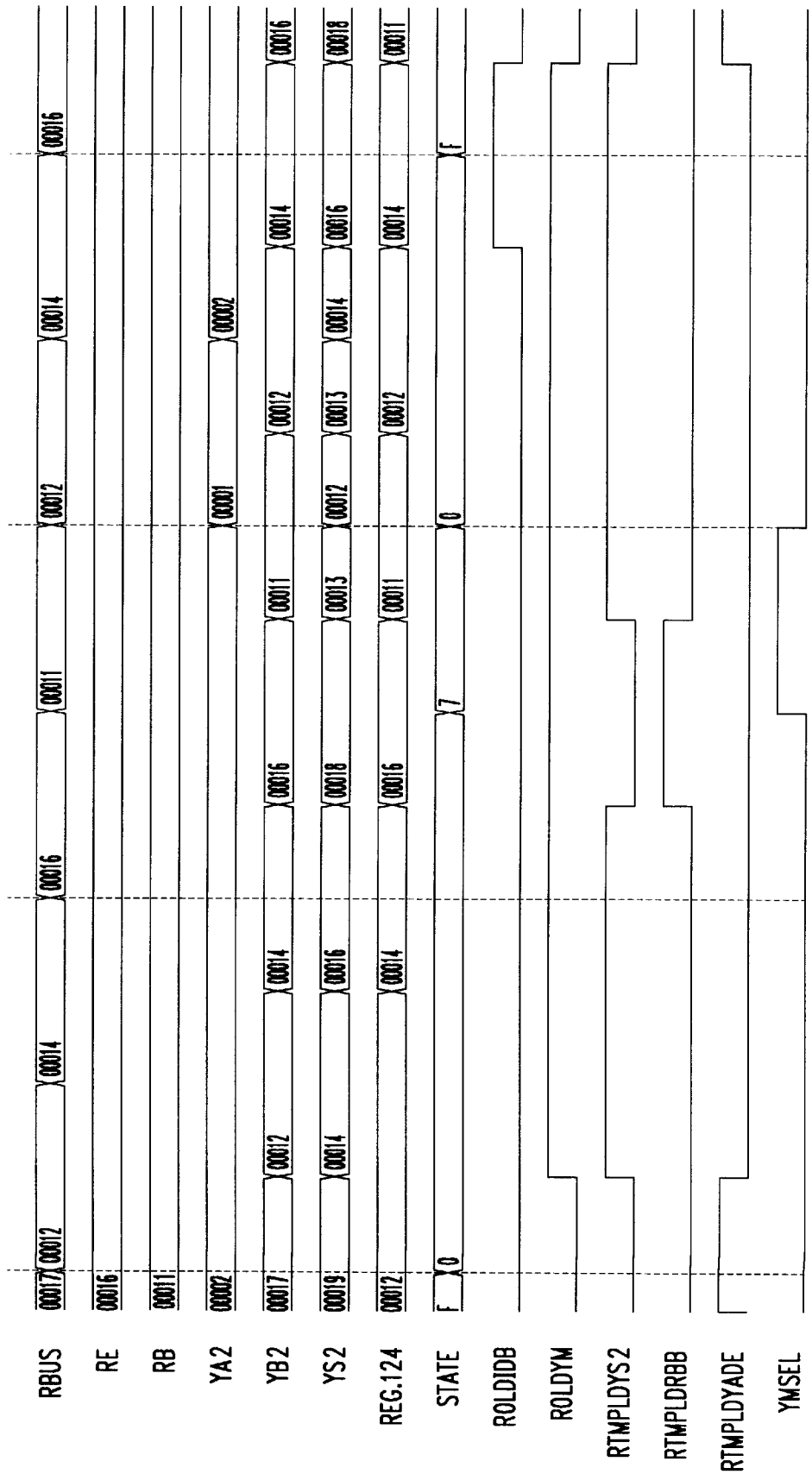
Figure 8A:
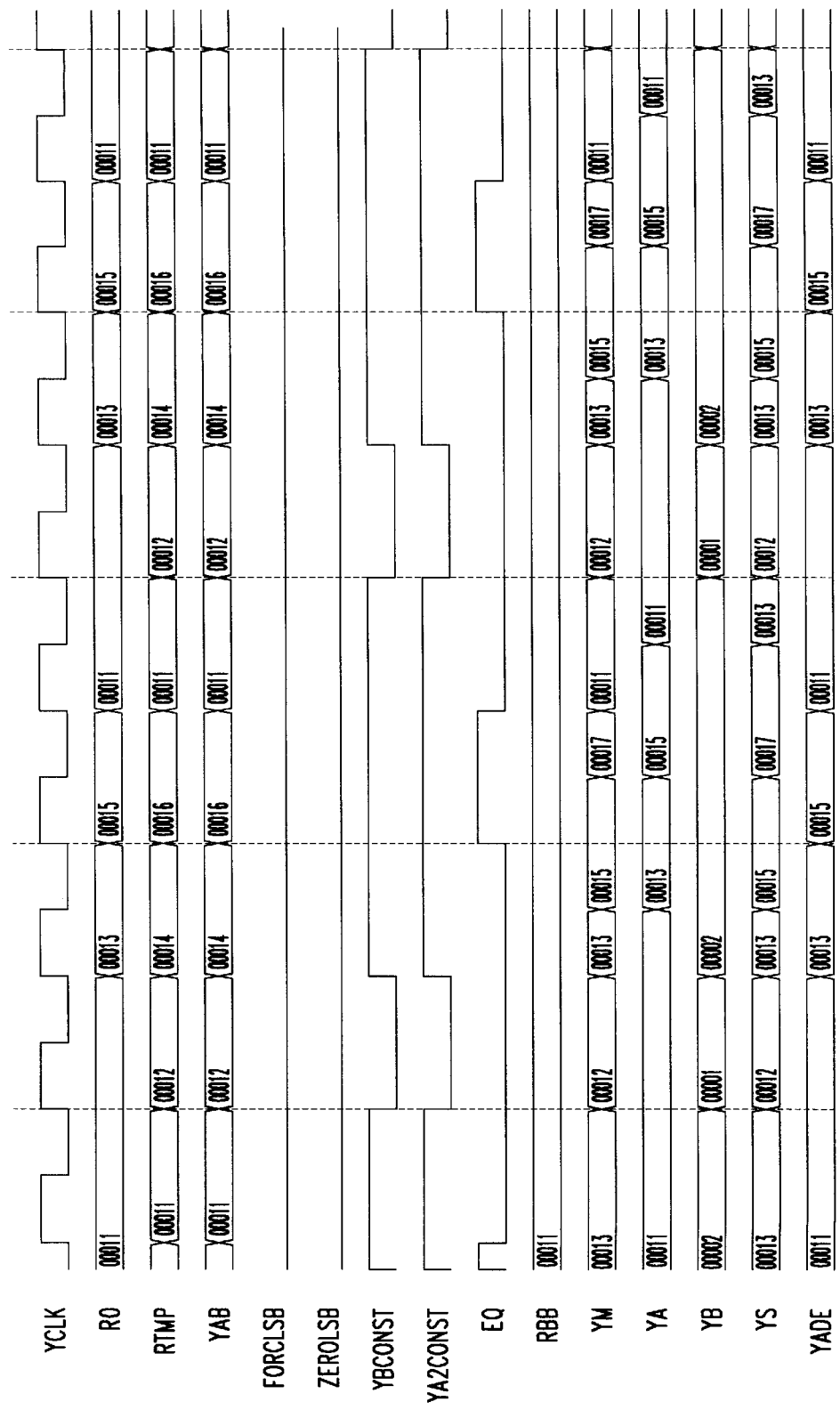
Figure 8B:
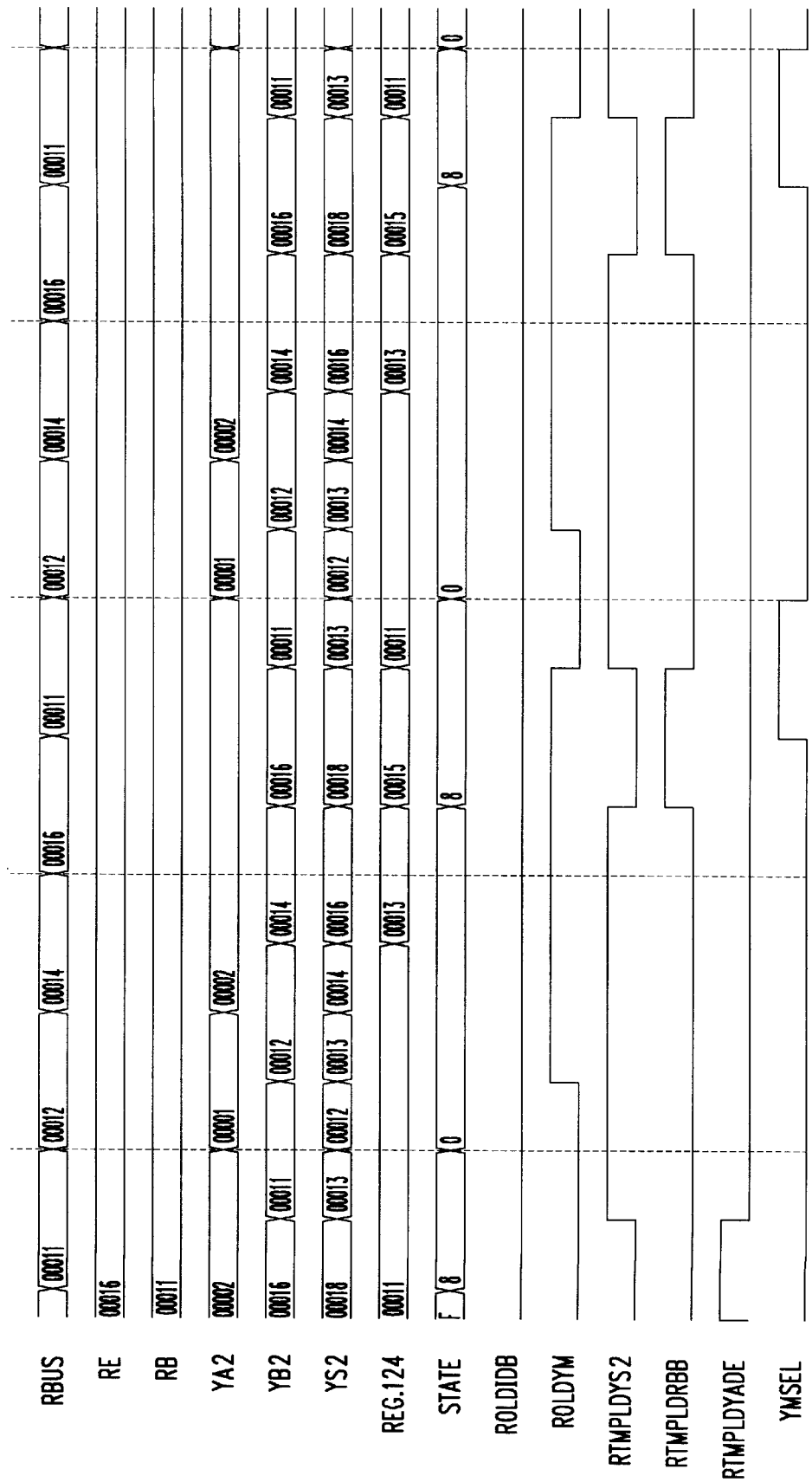

The general purpose of the apparatus 110 shown in FIG. 2A and the control circuit 720 of FIG. 2B is to supply addresses or signals YAB on the address bus which is data output port 620c shown in FIG. 2B, for the purpose of accessing a circular memory buffer (not shown) having a certain fixed beginning address (stored in a beginning address register 320) and a certain fixed ending address (stored in an ending address register 420).

The apparatus 110 comprises a first feedback circuit 120, a second feedback circuit 220, a beginning address register 320 and OR gate 322, an ending address register 420, a comparator circuit 520, a second multiplexer 620 and an And Gate circuit 622

The first feedback circuit 120 includes a first register 122 (which will at times be referred to as "R0" since it holds the value of "R0" or the signal or data "R0" also known as the pointer value), a first phase delay register 124, a first adder 126, a first displacement register 128 and a first multiplexer 130. A data output port 122a of the first register 122 is connected to the data input port 124a of the first phase delay register 124. The signal YADE is located on the data output port 122a and the data input port 124a. The data output port 126a of the first phase delay register 124 is connected to a first data input port 126a of the first adder 126. The signal YA is located on the data output port 126a. The data output port 126b of the first displacement register 128 is connected to a second data input port 126b of the first adder 126. The signal YB is located on the data input port 126b. The data output port 130a of the first adder 126 is connected to a first data input port 130a of the first multiplexer 130. The signal YS is located on the first data input port 130a. The second data input port 130b of the first multiplexer 130 is connected to the modified data output port 320c from the beginning address register 320 after the output port 322a of the Or circuit 322. The signal RBB is located on the input port 130b. The beginning register 320 has an output port 320a which is split into output port 320b comprised of all the bits except the least significant bit, and output port 322b which is comprised of the least significant bit. The output port 322b is input to the OR gate 322 along with the input port 321a. The signal FORCLSB is located on the input port 321a. The single bit output port 322a from the OR gate 322 is combined with the output port 320b to form a complete output or word at input port 130b. The signal RBB is located on input port 130b and is the modified beginning address however it may be referred to as the beginning address for convenience.

The second feedback circuit 220 includes a second register 222 (which at times will be referred to as "RTMP", since it holds the value of "RTMP" also known as the data or signal "RTMP", also known as the temporary pointer register), a second phase delay register 224, a second adder 226, and a second displacement register 228. The data output port 222a of the second register is connected to the data input port 224b of the second phase delay register 224. The signal RBUS is located on the output port 222a. The data output port 224a of the second phase delay register 224 is connected to the second data input port 224a of the second adder 226. The signal YB2 is located on the second data input port 224a. The first data input port 228a of the second adder 226 is connected to the data output port 228a of the second displacement register 228. The signal YA2 is located on the output port 228a.

The second register 222 also has a first data input port 222b which is connected to the output port 122a of the first register, and a second data input port 222c which is connected to the modified output port 320c from the beginning address register 320 and Or gate 322. The signal YADE is located on the data input port 222b. The signal REB is located on the data input port 222c.

The data output port 222a of the second register 222 is also connected to a second data input port 520a of the comparison circuit 520. The first data input port 420a of the comparison circuit 520 is connected to the data output port 420a of the ending address register 420. The signal RE is located on the first data input port 420a.

The data output port 122a from the first feedback circuit 120 and the data output port 222a from the second feedback circuit 220 are supplied as first and second data input ports, respectively, to the second multiplexer 620. The data output port 620a of the second multiplexer 620 is split into a data output port 620b of all the bits except the least significant bit and data output port 622a of the least significant bit. The data output port 622a is supplied as an input port to AND gate circuit 622 along with the input port 622b. The signal ZEROLSB is located on input port 622b. The output port 622c of the OR gate is combined with the output port 620b to form a complete output port 620c, which is the address bus. The YAB signal, or address bus signal is located on the output port 620c.

In addition to the connections described, various components of the apparatus 110 in FIG. 2A are connected to a control circuit 720 shown in FIG. 2B. The control circuit 720 has the following input and output signals.

Control Circuit 720 INPUT signals:
RELSB: Least significant bit of Ending Address contained in Ending address register 420 ("RE").
RBLSB: Least significant bit of Beginning Address contained in Beginning address register 320 ("RB").
ROLSB: Least significant bit of Address Pointer contained in first register 122 ("R0").
EQ: Output signal on output 520a of Comparison Circuit 520 which specifies whether the temporary address pointer in second register 222 ("RTMP") is equal (at times disregarding least significant bits) to the ending address in ending address register 420.
Control Circuit 720 OUTPUT signals (Each signal has a value of "0" or "1" unless indicated):
ROLDYM:
  0: suppresses loading of R0.
  1: loads R0 (i.e. first register 122) on the leading edge of the clock from data output signal YM.
RBFORCLSB:
  0: doesn't affect the LSB of RBB signal (modified beginning address)
  1: forces LSB of RBB signal high.
RTMPLDYS2:
  0: RTMP (i.e. second register 222) not loaded from output signal YS2.
  1: RTMP loaded from output signal YS2, when clock signal is high.
RTMPLDRBB:
  0: RTMP not loaded from output signal RBB.
  1: RTMP loaded from output signal RBB, when clock signal is high.
RTMPLDYADE:
  0: RTMP not loaded from output signal YADE.
  1: RTMP loaded with output signal YADE, when clock signal is high.
YBCONST:
  0: YBCONST displacement=1.
  1: YBCONST displacement=2.
YA2CONST:
  0: YA2CONST displacement=1.
  1: YA2CONST displacement=2.
YMSEL:
  0: Passes First Adder 126 output signal YS to output port 130c as output signal YM.
  1: Passes RBB output signal to output port 130c as output signal YM.
YABZEROLSB:
  0: Does NOT zero the least significant bit to be provided as address YAB output signal.
  1: Does zero the least significant bit to be provided as address YAB output signal.
YABSEL:
  0: RTMP (i.e. in second register 222) passes through multiplexer 620 and after modification as address output signal YAB.
  1: R0 (i.e. first register 122) passes through multiplexer 620 and after modification as address output signal YAB.
R0LDIDB: Any value: initializes R0 (in first register 122) directly from control circuit 720.

The control circuit 720 in addition to the above input and output signals from and to the apparatus 110, keeps track of a variable called "STATE". The control circuit 720 executes a repetitive series of "STATEs" in order to implement an embodiment of the invention. The "STATEs" executed depend on whether the beginning address (RB) in beginning address register 320, the ending address (RE) in ending address register 420, and the pointer address (R0) in first register 122, are odd or even. There are eight Cases for the different possible values of RB, RE, and R0, as shown below:

Table of Cases:

| RB | RE | R0 | Case | STATEs Executed |
|---|---|---|---|---|
| Even | Odd | Even | 1 | F, 0, |
| Even | Odd | Odd | 2 | F, 1, 0, 2 |
| Even | Even | Even | 3 | F, 0, 3 |
| Even | Even | Odd | 4 | F, 0, 3 |
| Odd | Odd | Odd | 5 | F, 4, 0, 5, 6 |
| Odd | Odd | Even | 6 | F, 4, 0, 5, 6 |
| Odd | Even | Even | 7 | F, 0, 7 |
| Odd | Even | Odd | 8 | F, 0, 8 |

Note that the initialization STATE is done once, i.e. "F" and the other STATEs periodically repeat for the most part unless reinitialization is required.

The "STATEs" executed by the control circuit 720 for each Case will be described below. Timing diagrams shown in FIGS. 3A–B, 4A–B, 5A–B, 6A–B, 7A–B, and 8A–B show the timing of output and input signals for apparatus 110 and control circuit 720, for Cases 1, 2, 3/4, 5/6, 7 and 8, respectively. YCLK is a clock signal which may be located on the control circuit 720. A copy of a computer program for use in a control circuit 720 is attached at the end of the specification, prior to the claims. The computer program is merely exemplary of how the present invention can be accomplished.

Case 1—Initialization (STATE=1111=F)

(RB-even, RE-odd, R0-Even, EQU=0)

Summary: The first register 122 (R0) is loaded by control circuit 720 with an initial address, the second register 222 (RTMP) is loaded by R0 value, displacement constants YBCONST and YA2CONST are set to 2, the first multiplexer 130 passes the input signal YS from the first adder 126 for incrementing the address, and the second multiplexer 620 passes the input signal R0 (or YADE) from R0 to the address bus YAB.

Control circuit 720 sets these variables or signals to the following values (note the use of "i" after signals below to provide a clocked output. The "i" signals are pure combinational logic and are used as data to flips flops, not shown, which are triggered by the leading edge of the clock pulses CLK). The "i" signals are what is going to happen the next clock cycle. (The "i" variables or signals are shown in lower case as used in the computer program, attached):

| | |
|---|---|
| Roldymi = 0: | R0 is loaded with the RBB on the leading edge of the clock, not from output signal YM. |
| Rbforclsbi = 0: | |
| rtmpldys2i = 0: | |
| rtmpldrbbi = 0: | |
| rtmpldyadei = 1: | RTMP (second register 222 is loaded with R0 (first register 122), from output signal YADE just after R0 has been changed to 10, on leading edge of clock. |
| ybconsti = 1: | YBCONST displacement takes on a value of 2. |
| ya2consti = 1: | YACONST displacement takes on a value of 2. |
| ymseli = 0: | First multiplexer 130 will allow data output, for incrementing address, from First Adder 126 to pass to YM output signal of first multiplexer 130. |
| yabzerolsbi = 0: | When this is 0 the AND circuit 622 does NOT zero the least significant bit to be provided as an address YAB output signal. |
| yabseli = 1: | When this is 1 it allows the R0 (first register 122) output port 122a to pass through the second multiplexer 620 and to appear as output signal YAB. |

Case 1 - Operation with EQU=0 (STATE = 0)
(RB - even, RE - odd, R0 - Even, EQU = 0)

Summary: R0 (first register 122) loaded with first incremented address, RTMP (second register 222) loaded with second incremented address, R0 (first register 122) passed as address bus signal YAB.

Control circuit 720 sets these variables to the following values:

| | |
|---|---|
| Roldymi = 1: | R0 (first register 122) is loaded with value from output signal YM from the first multiplexer 130. (output signal YM here provides incremented address). |
| Rbforclsbi = 0: | |
| rtmpldys2i = 1: | RTMP (second register 222) is loaded with value from output signal YS2 from second adder. (output signal YS2 provides incremented address) |
| rtmpldrbbi = 0: | |
| rtmpldyadei = 1: | |
| ybconsti = 1: | YBCONST displacement = 2. |
| ya2consti = 1: | YACONST displacement = 2. |
| ymseli = 0: | First multiplexer 130 will allow data output, for incrementing address, from First Adder 126 to pass to output port 130c of first multiplexer 130 as YM output signal. |
| yabzerolsbi = 0: | When this is 0 the AND circuit 622 does NOT zero the least significant bit to be provided as address as YAB output signal. |
| yabseli = 1: | When this is 1 it allows the output signal YADE from R0 to pass through the second multiplexer 620 and to appear on output port 620c as address bus signal YAB. |

Case 1 - Operation with EQU=1 (STATE = 0)
(RB - even, RE - odd, R0 - Even, EQU = 1)

Summary: R0 loaded with beginning address, RTMP loaded with beginning address, and R0 passes as address bus signal YAB.

Control circuit 720 sets these variables to the following values:

| | |
|---|---|
| Roldymi = 1: | R0 is loaded with value from output signal YM from first multiplexer 130. (output signal YM here provides beginning address). |
| Rbforclsbi = 0: | |

-continued rtmpldys2i = 0:
rtmpldrbbi = 1: RTMP is loaded with value from beginning address register 320 as modified at output port 320c.
rtmpldyadei = 0:
ybconsti = 1: YBCONST displacement = 2.
ya2consti = 1: YACONST displacement = 2.
ymseli = 1: First multiplexer 130 will allow data output signal, from beginning address register 320 modified, RBB to pass as YM output signal of first multiplexer 130.
yabzerolsbi = 0: When this is 0 the AND circuit 622 does NOT zero the least significant bit to be provided as address YAB output signal.
yabseli = 1: When this is 1 it allows the R0 output signal YADE to pass through the second multiplexer 620 and to appear as address bus YAB signal.

Case 2 - First Initialization with EQU=0 (STATE = 1111 = F)
    (RB - even, RE - odd, R0 - odd, EQU = 0)
  Summary: See Case 1 initialization.

Case 2 - First Interim with EQU=0 (STATE = 0001)
    (RB - even, RE - odd, R0 - odd, EQU = 0)
  Summary: R0 (first register 122) loading suppressed, RTMP (second register 222) loaded direct from control circuit 720, YACONST displacement changes to 1, and RTMP put out as address bus signal YAB.
  Control circuit 720 sets these variables to the following values:

roldymi = 0: Suppress loading of R0 from output signal YM.
rbforclsbi = 0:
rtmpldys2i = 1: This would load an incremented address into RTMP. A clocked registered output.
rtmpldrbbi = 0:
rtmpldyadei = 0:
ybconsti = 1: YBCONST displacement = 2.
ya2consti = 0: YACONST displacement = 1.
ymseli = 0: First multiplexer 130 will allow data output, from incremented address from first adder 126 to pass as YM output signal of first multiplexer 130.
yabzerolsbi = 0: When this is 0 the AND 622 circuit does NOT zero the least significant bit to be provided as address on YAB output signal.
yabseli = 0: When this is 0 it allows the RTMP output to pass through the second multiplexer 620 and to appear as address bus YAB signal.

Case 2 - Operational with EQU=0 (STATE = 0000)
    (R0 - even, RE - odd, R0 - odd, EQU = 0)
  Summary: R0 (first register 122) loaded with incremented address from first adder 126, RTMP (second register 222) loaded with incremented address from second adder 226, RTMP passes as address bus YAB signal.
  Control circuit 720 sets these variables to the following values:

Roldymi = 1: R0 loaded from output signal YM of first multiplexer 130.
Rbforclsbi = 0:
rtmpldys2i = 1: This would load an incremented address into RTMP from second adder 226.
rtmpldrbbi = 0:
rtmpldyadei = 0:
ybconsti = 1: YBCONST displacement = 2.
ya2consti = 1: YACONST displacement = 2.
ymseli = 0: First multiplexer 130 will allow data output signal YS, from incremented address from first adder 126 to pass as YM output signal of first multiplexer 130.
yabzerolsbi = 0: When this is 0 the AND circuit 622 does NOT zero the least significant bit to be provided as address as YAB output signal.
yabseli = 0: When this is 0 it allows the RTMP output signal RBUS to pass through the second multiplexer 620 and to appear as address bus YAB signal.

Case 2 - Operational with EQU=1 (STATE = 0000)
    (RB - even, RE - odd, R0 - odd, EQU = 1)
  Summary: Only change from Operational with EQU = 0 is that YACONST is set to 1. The registers R0 and RTMP are not set to the beginning address value in STATE 0000, another STATE is needed.
  Control circuit 720 sets these variables to the following values:

-continued

| | |
|---|---|
| Roldymi = 1: | R0 loaded from output YM signal of first multiplexer 130. |
| Rbforclsbi = 0: | |
| rtmpldys2i = 1: | This would load an incremented address into RTMP from second adder 126. |
| rtmpldrbbi = 0: | |
| rtmpldyadei = 0: | |
| ybconsti = 1: | YBCONST displacement = 2. |
| ya2consti = 0: | YACONST displacement = 1. |
| ymseli = 0: | First multiplexer 130 will allow data output, from incremented address from first adder 126 to pass as YM output signal of first multiplexer 130. |
| yabzerolsbi = 0: | When this is 0 the AND circuit 622 (AND circuit 622 includes an AND gate and a inverter in front of one input) does NOT zero the least significant bit to be provided as address as YAB output signal. |
| yabseli = 0: | When this is 0 it allows the RTMP output to pass through the second multiplexer 620 and to appear as address bus YAB signal. |

Case 2 - Restart with EQU=1 (STATE = 0010 = 2)
(RB - even, RE - odd, R0 - odd, EQU = 1)

Summary: R0 (first register 122) and RTMP (second register 222) loaded with beginning address modified, i.e. signal RBB, from beginning address register 320.

Control circuit 720 sets these variables to the following values:

| | |
|---|---|
| Roldymi = 1: | R0 loaded from output YM signal of first multiplexer 130. |
| Rbforclsbi = 1: | Force the least significant bit of RB on the RBB bus to be set to "1". |
| rtmpldys2i = 0: | |
| rtmpldrbbi = 1: | This would load RTMP beginning address from register 320 modified (RBB). |
| rtmpldyadei = 0: | |
| ybconsti = 1: | YBCONST displacement = 2. |
| ya2consti = 0: | YACONST displacement = 1. |
| ymseli = 1: | First multiplexer 130 will allow data output, from beginning address register RBB (as modified) to pass as YM output signal of first multiplexer 130. |
| yabzerolsbi = 1: | Force the least significant bit of output bus where YAB signal appears to be cleared, i.e. to be "0". |
| yabseli = 0: | When this is 0 it allows the RTMP output signal to pass through the second multiplexer 620 and to appear as address bus YAB signal. |

Case 3 - First Initialization with EQU=1 (STATE = 1111 = F)
(RB - even, RE - even, R0 - even then odd, EQU = 1)

Summary: See Case 1 Initialization.

Case 3 - Operational with EQU=0 (STATE = 0000)
First Case 3 (RB - even, RE - even, R0 - even (herein even) then odd, EQU = 1)

Summary: R0 and RTMP loaded with incremented addresses, and RTMP passes as address bus YAB signal.

Control circuit 720 sets these variables to the following values:

| | |
|---|---|
| Roldymi = 1: | R0 loaded from output YM signal of first multiplexer 130. |
| Rbforclsbi = 0: | |
| rtmpldys2i = 1: | This would load RTMP with second adder 226 incremented address. |
| rtmpldrbbi = 0: | |
| rtmpldyadei = 0: | |
| ybconsti = 1: | YBCONST displacement = 2. |
| ya2consti = 1: | YACONST displacement = 2. |
| ymseli = 0: | First multiplexer 130 will allow data output, from first adder 126 to pass as YM output signal of first multiplexer 130. |
| yabzerolsbi = 0: | When this is 0 the AND circuit 622 does Not zero the least significant bit to be provided as address YAB output signal. |
| yabseli = 0: | When this is 0 it allows the RTMP output signal (RBUS) to pass through the second multiplexer 620 and to appear as address bus YAB signal. |

Case 3 - Operational with EQU=1 (STATE = 0000)
First Case 3 (RB - even, RE - even, R0 - even (herein even) then odd, EQU = 1)

Summary: Loading of R0 suppressed, RTMP loaded with beginning address, (as modified RBB) and RTMP output signal RBUS passes as -continued

```
Address Bus YAB signal.
        Control circuit 720 sets these variables to the following
values:
roldymi = 0:    Suppress R0 loading.
rbforclsbi = 0:
rtmpldys2i = 0:
rtmpldrbbi = 1:    This would load RTMP with modified beginning
                   address (RBB).
rtmpldyadei = 0:
ybconsti = 1:   YBCONST displacement = 2.
ya2consti = 1:  YACONST displacement = 2.
ymseli = 0:     First Adder 126 data output signal YS passes as YM
                output signal.
yabzerolsbi = 0:   Address Bus YAB signal LSB not zeroed.
yabseli = 0:    RTMP output signal (RBUS) passes as Address Bus YAB
                signal.
                    Case 3 - Restart with EQU=1 (STATE = 0011 = 3)
            (R0 - even, RE - even, R0 - even (herein even) then odd, EQU = 1)
        Summary: R0 loaded with beginning address, RTMP incremented,
and RTMP passes as Address bus YAB signal.
        Control circuit 720 sets these variables to the following
values:
roldymi = 1:    R0 loaded from output YM signal.
rbforclsbi = 1:    Need to force R0 to (RB+1) by setting least
                   significant bit to keep, R0 correct after
                   wrap.
rtmpldys2i = 1:    RTMP loaded with incremented address from
                   second adder 226 YS2 output signal.
rtmpldrbbi = 0:
rtmpldyadei = 0:
ybconsti = 1:   YBCONST displacement = 2.
ya2consti = 1:  YA2CONST displacement = 2.
ymseli = 1:     Beginning address output RBB signal passes as YM
                output signal.
yabzerolsbi = 0:   Address Bus YAB signal LSB not zeroed.
yabseli = 0:    RTMP output signal (RBUS) passes as Address Bus YAB
                signal.
                    Case 4 - Operational with EQU=0 (STATE = 0011 = 3)
            Second Case 4 (RB - even, RE - even, R0 - odd) then odd, EQU = 0)
        Summary: R0 and RTMP loaded with incremented addresses, RTMP
passes as address bus YAB signal.
        Control circuit 720 sets these variables to the following
values:
roldymi = 1:    R0 loaded from output YM signal.
rbforclsbi = 0:
rtmpldys2i = 1:    RTMP loaded with incremented address from
                   second adder 226, YS2 output signal.
rtmpldrbbi = 0:
rtmpldyadei = 0:
ybconsti = 1:   YBCONST displacement = 2.
ya2consti = 1:  YACONST displacement = 2.
ymseli = 0:     Incremented address from first adder 126 passes to
                YM output signal.
yabzerolsbi = 0:   Address Bus YAB signal LSB not zeroed.
yabseli = 0:    RTMP output passes to Address Bus YAB signal.
                    Case 4 - Operational with EQU=1 (STATE = 0011 = 3)
            Second Case 4 (RB - even, RE - even, R0 - odd) then odd, EQU = 1)
        Summary: R0 and RTMP loaded with beginning address (RBB), and
RTMP passes to Address Bus 620c as YAB signal.
        Control circuit 720 sets these variables to the following
values:
Roldymi = 1:    R0 loaded from output YM signal.
Rbforclsbi = 0:
rtmpldys2i = 0:
rtmpldrbbi = 1:    RTMP loaded with beginning address RBB.
rtmpldyadei = 0:
ybconsti = 1:   YBCONST displacement = 2.
ya2consti = 1:  YACONST displacement = 2.
ymseli = 1:     Beginning address passes as YM output signal.
yabzerolsbi = 0:   Address Bus YAB signal LSB not zeroed.
yabseli = 0:    RTMP output passes as Address Bus YAB signal.
                Case 5 - First Initialization with EQU=1 (STATE = 1111 = F)
            (RB - odd, RE - odd, R0 - odd (then even for case 6), EQU = 1)
        Summary: See Case 1 Initialization.
                    Case 5- Interim (STATE = 0100 = 4)
            (RB - odd, RE - odd, R0 - odd) then even for case G, EQU = 0)
        Summary: R0 suppressed, RTMP loaded with incremented address,
and RTMP passes onto Address Bus YAB signal.
        Control circuit 720 sets these variables to the following
```

-continued values:
r0ldymi = 0:     Suppress R0 loading.
rbforclsbi = 0:
rtmpldys2i = 1:     RTMP loaded with incremented address from second adder 226, YS2 output signal.
rtmpldrbbi = 0:
rtmpldyadei = 0:
ybconsti = 1:     YBCONST displacement = 2.
ya2consti = 1:     YACONST displacement = 2.
ymseli = 1:     Beginning address RBB passes as YM output signal.
yabzerolsbi = 1:     Address Bus YAB signal LSB zeroed.
yabseli = 0:     RTMP output signal (RBUS) passes as Address Bus YAB signal.

Case 5- Interim (STATE = 0101 = 5)
   (RB - odd, RE - odd, R0 - odd) then even for case 6, EQU = 0)
 Summary: R0 loaded with beginning address RBB, RTMP loading suppressed, and RTMP output passes onto address bus.
  Control circuit 720 sets these variables to the following values:
r0ldymi = 1:     R0 loaded from YM output signal.
Rbforclsbi = 0:     Suppress RTMP loading.
rtmpldys2i = 0:
rtmpldrbbi = 0:
rtmpldyadei = 0:
ybconsti = 1:     YBCONST displacement = 2.
ya2consti = 1:     YACONST displacement = 2.
ymseli = 1:     Beginning address, RBB passes as YM output signal.
yabzerolsbi = 0:     Address Bus YAB signal LSB not zeroed.
yabseli = 0:     RTMP output signal (RBUS) passes as Address Bus YAB signal.

Case 5- Interim (STATE = 0110 = 6)
   (RB - odd, RE - odd, R0 - odd) then even for case 6, EQU = 0)
 Summary: R0 loaded with incremented address, RTMP loaded with incremented address, displacements are set to 1, RTMP passes as address bus YAB signal.
  Control circuit 720 sets these variables to the following values:
r0ldymi = 1:     R0 loaded from YM output signal.
rbforclsbi = 0:
rtmpldys2i = 1:     RTMP loaded from second adder 226 output YS2 signal.
rtmpldrbbi = 0:
rtmpldyadei = 0:
ybconsti = 0:     YBCONST displacement = 1.
ya2consti = 0:     YACONST displacement = 1.
ymseli = 0:     Incremented address from second adder 226 passes as YM output signal.
yabzerolsbi = 1:     Address Bus YAB signal LSB zeroed.
yabseli = 0:     RTMP output signal (RBUS) passes as Address Bus YAB signal.

Case 5- Operational, EQU = 0 (STATE = 0000)
   (RB - odd, RE - odd, R0 - odd) then even for case 6, EQU = 0)
 Summary: R0 and RTMP loaded with incremented addresses, and RTMP passes out onto address bus YAB signal.
  Control circuit 720 sets these variables to the following values:
roldymi = 1:     Load R0 with output YM signal.
rbforclsbi = 0:
rtmpldys2i = 1:     RTMP loaded with incremented address from second adder 226 YS2 output signal.
rtmpldrbbi = 0:
rtmpldyadei = 0:
ybconsti = 1:     YBCONST displacement = 2.
ya2consti = 1:     YACONST displacement = 2.
ymseli = 0:     Incremented address from first adder 126 passes as YM output signal.
yabzerolsbi = 0:     Address Bus YAB signal LSB not zeroed.
yabseli = 0:     RTMP output signal (RBUS) passes as Address Bus YAB signal.

Case 5- Operational, EQU = 1 (STATE = 0000)
   (RB - odd, RE - odd, R0 - odd) then even for case 6, EQU = 1)
 Summary: R0 loaded with Incremented address, RTMP loaded with beginning address RBB, and RTMP output passes as address bus YAB signal.
  Control circuit 720 sets these variables to the following values:
r0ldymi = 1:     Load R0 with output YM signal.
rbforclsbi = 0:
rtmpldys2i = 0:

-continued

| | |
|---|---|
| rtmpldrbbi = 1: | RTMP loaded with beginning address RBB. |
| rtmpldyadei = 0: | |
| ybconsti = 1: | YBCONST displacement = 2. |
| ya2consti = 1: | YACONST displacement = 2. |
| ymseli = 0: | Incremented address from first adder 126 passes as YM output signal. |
| yabzerolsbi = 0: | Address Bus YAB signal LSB not zeroed. |
| yabseli = 0: | RTMP output passes as Address Bus YAB signal. |

Case 6- Operational, EQU = 0 same as case 5, (STATE = 0000)
(RB - odd, RE - odd, R0 - even) then even for case 6, EQU = 0)
Summary: R0 and RTMP loaded with incremented addresses, and RTMP passes out onto address bus YAB signal.
Control circuit 720 sets these variables to the following values:

| | |
|---|---|
| r0ldymi = 1: | Load R0 with output YM signal. |
| rbforclsbi = 0: | |
| rtmpldys2i = 0: | RTMP loaded with incremented address from second adder 226 YS2 output signal. |
| rtmpldrbbi = 0: | |
| rtmpldyadei = 0: | |
| ybconsti = 1: | YBCONST displacement = 2. |
| ya2consti = 1: | YA2CONST displacement = 2. |
| ymseli = 0: | Incremented address from first adder 126 passes as YM output signal. |
| yabzerolsbi = 0: | Address Bus YAB signal LSB not zeroed. |
| yabseli = 0: | RTMP output signal (RBUS) passes as Address Bus YAB signal. |

Case 6- Operational, EQU = 1 (STATE = 0000)
(RB - odd, RE - odd, R0 - even) then even for case 6, EQU = 1)
Summary: R0 loaded with Modified Beginning address RBB, RTMP loaded with beginning address, and RTMP output passes as address bus YAB signal.
Control circuit 720 sets these variables to the following values:

| | |
|---|---|
| r0ldymi = 1: | Load R0 with output YM signal. |
| rbforclsbi = 0: | |
| rtmpldys2i = 0: | |
| rtmpldrbbi = 1: | RTMP loaded with beginning address, RBB. |
| rtmpldyadei = 0: | |
| ybconsti = 1: | YBCONST displacement = 2. |
| ya2consti = 1: | YA2CONST displacement = 2. |
| ymseli = 1: | Beginning address passes as YM output signal. |
| yabzerolsbi = 0: | Address Bus YAB signal LSB not zeroed. |
| yabseli = 0: | RTMP output passes as Address Bus YAB signal. |

Case 7 - First Initialization with EQU=1 (STATE = 1111 = F)
(RB - odd, RE - even, R0 - even)
Summary: See Case 1 Initialization.

Case 7 - Interim (STATE = 0111 = 7)
(RB - odd, RE - even, R0 - even)
Summary: R0 and RTMP loaded with incremented addresses, and RTMP passes as address bus YAB signal.
Control circuit 720 sets these variables to the following values:

| | |
|---|---|
| roldymi = 1: | R0 loaded from YM output signal. |
| rbforclsbi = 0: | |
| rtmpldys2i = 1: | RTMP loaded from second adder 226 output YS2 signal. |
| rtmpldrbbi = 0: | |
| rtmpldyadei = 0: | |
| ybconsti = 0: | YBCONST displacement = 1. |
| ya2consti = 0: | YA2CONST displacement = 1. |
| ymseli = 0: | Incremented address from second adder 226 passes as YM output signal. |
| yabzerolsbi = 0: | Address Bus YAB signal LSB not zeroed. |
| yabseli = 0: | RTMP output signal (RBUS) passes as Address Bus YAB signal. |

Case 7- Operational , EQU = 0, (STATE = 0000)
(RB - odd, RE - even, R0 - even, EQU = 0)
Summary: R0 and RTMP loaded with incremented addresses, and RTMP passes out onto address bus.
Control circuit 720 sets these variables to the following values:

| | |
|---|---|
| r0ldymi = 1: | Load R0 with output YM signal. |
| rbforclsbi = 0: | |
| rtmpldys2i = 1: | RTMP loaded with incremented address from second adder 226 YS2 output signal. |
| rtmpldrbbi = 0: | |
| rtmpldyadei = 0: | |
| ybconsti = 1: | YBCONST displacement = 2. |

-continued

```
ya2consti = 1:      YACONST displacement = 2.
ymseli = 0:         Incremented address from first adder 126 passes as
                    YM output signal.
yabzerolsbi = 0:    Address Bus YAB signal LSB not zeroed.
yabseli = 0:        RTMP output signal (RBUS) passes as Address Bus YAB
                    signal.
            Case 7- Operational, EQU = 1 (STATE = 0000)
                (RB - odd, RE - even, R0 - even, EQU = 1)
    Summary: R0 loaded with Beginning address, RTMP loaded with
beginning address, and RTMP output passes to address bus 620c.
        Control circuit 720 sets these variables to the following
values:
r0ldymi = 1:        Load R0 with output YM signal.
rbforclsbi = 0:
rtmpldys2i = 0:
rtmpldrbbi = 1:     RTMP loaded with beginning address.
rtmpldyadei = 0:
ybconsti = 1:       YBCONST displacement = 2.
ya2consti = 1:      YA2CONST displacement = 2.
ymseli = 1:         Beginning address RBB passes as YM output signal.
yabzerolsbi = 0:    Address Bus YAB signal LSB not zeroed.
yabseli = 0:        RTMP output passes as Address Bus YAB signal.
            Case 8 - First Initialization (STATE = 1111 = F)
                (RB - odd, RE - even, R0 - odd)
    Summary: See Case 1 Initialization.
            Case 8 - Interim (STATE = 0111 = 8)
                (RB - odd, RE - even, R0 - odd)
    Summary: R0 loading suppressed. RTMP loaded with incremented
addresses, and RTMP passes as address bus YAB signal.
        Control circuit 720 sets these variables to the following
values:
r0ldymi = 0:        R0 loading suppressed.
rbforclsbi = 0:
rtmpldys2i = 1:     RTMP loaded from second adder 226 output YS2
                    signal.
rtmpldrbbi = 0:
rtmpldyadei = 0:
ybconsti = 0:       YBCONST displacement = 1.
ya2consti = 0:      YA2CONST displacement = 1.
ymseli = 0:         Incremented address from second adder 226 passes as
                    YM output signal.
yabzerolsbi = 0:    Address Bus YAB signal LSB not zeroed.
yabseli = 0:        RTMP output passes as Address Bus YAB signal.
        Case 8- Operational (variables set same as case 7 operational),
                EQU = 0, (STATE = 0000)
                (RB - odd, RE - even, R0 - odd, EQU = 0)
    Summary: R0 and RTMP loaded with incremented addresses, and
RTMP passes out onto address bus YAB signal.
        Control circuit 720 sets these variables to the following
values:
r0ldymi = 1:        Load R0 with output YM signal.
rbforclsbi = 0:
rtmpldys2i = 1:     RTMP loaded with incremented address from
                    second adder 226 YS2 output signal.
rtmpldrbbi = 0:
rtmpldyadei = 0:
ybconsti = 1:       YBCONST displacement = 2.
ya2consti = 1:      YACONST displacement = 2.
ymseli = 0:         Incremented address from first adder 126 passes as
                    YM output signal.
yabzerolsbi = 0:    Address Bus YAB signal LSB not zeroed.
yabseli = 0:        RTMP output passes as Address Bus YAB signal.
        Case 8- Operational (variables set same as in case 7), EQU = 1
                (STATE = 0000)
                (RB - odd, RE - even, R0 - odd, EQU = 1)
    Summary: R0 loaded with Beginning address RBB, RTMP loaded
with beginning address RBB, and RTMP output passes as address bus
YAB signal.
        Control circuit 720 sets these variables to the following
values:
r0ldymi = 1:        Load R0 with output YM signal.
rbforclsbi = 0:
rtmpldys2i = 0:
rtmpldrbbi = 1:     RTMP loaded with beginning address, RBB.
rtmpldyadei = 0:
ybconsti = 1:       YBCONST displacement = 2.
ya2consti = 1:      YACONST displacement = 2.
ymseli = 1:         Beginning address passes as YM output signal.
yabzerolsbi = 0:    Address Bus YAB signal LSB not zeroed.
```

| | -continued |
|---|---|
| yabseli = 0: | RTMP output signal (RBUS) passes to Address Bus YAB signal. |

Note that "connected" is used in a broad sense in this application to include inputs and outputs which are connected by wireless connections.

The "signals" such as the signal RBUS and other signals shown in FIGS. 3A–8B, can each be termed "data" also. For example, RBUS can be termed a "signal" or a piece of "data", at the physical data output port 222a of the second register 222.

The circuit disclosed in an embodiment of the present invention also has the following additional advantages over the FIG. 9 embodiment in Holmquist. In an embodiment of the present invention, pointer registers (i.e. R0), are always in the bounds of the beginning register (RB) and the ending register (RE). In the prior art a user reading the pointer would see the value as out of bounds. In addition, the equality comparator output (EQ) is used in an embodiment of the present invention for the next cycle of the control logic provided by the control circuit of FIG. 2B, and shown by signal diagrams in FIGS. 3A–8B. In Holmquist, the output shown herein in FIG. 1 and labelled as "34" is determined in the current cycle by the comparator 46 output 54.

Rhodes 4-19

APPENDIX— COMPUTER PROGRAM LISTING

\*\*\* comment - the signals such as "yclk" may be shown in the
computer program in lower case letters while shown in the drawings
and previous description as upper case "YCLK". However, whether
upper case or lower case, the same signals are being described.

```
LIBRARY ieee;
USE ieee.std_logic_1164.all;
USE ieee.std_logic_1164_extensions."+";

ENTITY aau IS
      PORT(
            yclk: IN std_ulogic;
            r0ldidb: IN std_ulogic;
            r0ldym: IN std_ulogic;
            reldidb: IN std_ulogic;
            rbldidb: IN std_ulogic;
            rbforclsb: IN std_ulogic;
            rtmpldys2: IN std_ulogic;
            rtmpldrbb: IN std_ulogic;
            rtmpldyade: IN std_ulogic;
            ybconst: IN std_ulogic;
            ya2const: IN std_ulogic;
            ymsel: IN std_ulogic;
            yabzerolsb: IN std_ulogic;
            yabsel: IN std_ulogic;
            idb: IN std_logic_vector(19 DOWNTO 0);
            r0lsb: OUT std_ulogic;
            rblsb: OUT std_ulogic;
            relsb: OUT std_ulogic;
            yab: OUT std_ulogic_vector(19 DOWNTO 0);
            eq: OUT std_ulogic
      );
END aau;

ARCHITECTURE behav OF aau IS
      SIGNAL rbb: std_ulogic_vector(19 DOWNTO 0);
      SIGNAL ym: std_ulogic_vector(19 DOWNTO 0);
      SIGNAL ya,yb,ys: std_ulogic_vector(19 DOWNTO 0);
      SIGNAL yade, rbus: std_ulogic_vector(19 DOWNTO 0);
      SIGNAL r0: std_ulogic_vector(19 DOWNTO 0);
      SIGNAL re: std_ulogic_vector(19 DOWNTO 0);
      SIGNAL rb: std_ulogic_vector(19 DOWNTO 0);
      SIGNAL ya2, yb2, ys2: std_ulogic_vector(19 DOWNTO 0);
      SIGNAL rtmp, rtmps: std_ulogic_vector(19 DOWNTO 0);
      SIGNAL slatch: std_ulogic_vector(19 DOWNTO 0);
      SUBTYPE v3 IS std_ulogic_vector(2 DOWNTO 0);
      SUBTYPE v2 IS std_ulogic_vector(1 DOWNTO 0);
      SUBTYPE v5 IS std_ulogic_vector(4 DOWNTO 0);
      SUBTYPE v4 IS std_ulogic_vector(3 DOWNTO 0);
BEGIN
```

Rhodes 4-19

```
r0lat: PROCESS(yclk, ym, idb, r0ldidb, r0ldym)
BEGIN
     CASE v3'(yclk, r0ldidb, r0ldym) IS
          WHEN "101" => r0 <= ym;
          WHEN "110" | "111" => r0 <= To_StdULogicVector(idb);
          WHEN OTHERS => NULL;
     END CASE;
END PROCESS r0lat;

yade <= r0;

relat: PROCESS(yclk, idb, reldidb)
BEGIN
     CASE v2'(yclk, reldidb) IS
          WHEN "11" => re <= To_StdULogicVector(idb);
          WHEN OTHERS => NULL;
     END CASE;
END PROCESS relat;

rblat: PROCESS(yclk, idb, ym, rbldidb)
BEGIN
     CASE v2'(yclk, rbldidb) IS
          WHEN "11" => rb <= To_StdULogicVector(idb);
          WHEN OTHERS => NULL;
     END CASE;
END PROCESS rblat;

rbbdrv: PROCESS(rb, rbforclsb)
BEGIN
     CASE rbforclsb IS
          WHEN '0' => rbb <= rb;
          WHEN '1' => rbb <= rb(19 DOWNTO 1) & '1';
          WHEN OTHERS => NULL;
     END CASE;
END PROCESS rbbdrv;

rtmplat:   PROCESS(yclk,   ys2,   rbb,   ys,   yade,   rtmpldys2,
            rtmpldrbb, rtmpldyade)

BEGIN
     CASE v4'(yclk & rtmpldys2 & rtmpldrbb & rtmpldyade) IS
          WHEN "1100" => rtmp <= ys2;
          WHEN "1010" => rtmp <= rbb;
          WHEN "1001" => rtmp <= yade;
          WHEN OTHERS => NULL;
     END CASE;
END PROCESS rtmplat;

rbus <= rtmp;

rtmpslat: PROCESS(yclk, rbus)
BEGIN
     CASE yclk IS
```

32

Rhodes 4-19

```
            WHEN '0' => rtmps <= rbus;
            WHEN OTHERS => NULL;
      END CASE;
END PROCESS rtmpslat;

yb2 <= rtmps;

slatchp: PROCESS(yclk, yade)
BEGIN
      CASE yclk IS
            WHEN '0' => slatch <= yade;
            WHEN OTHERS => NULL;
      END CASE;
END PROCESS slatchp;

ya <= slatch;

con1: PROCESS(ybconst)
BEGIN
      CASE ybconst IS
            WHEN '0' => yb <= "00000000000000000001";
            WHEN '1' => yb <= "00000000000000000010";
            WHEN OTHERS => yb <= "XXXXXXXXXXXXXXXXXXXX";
      END CASE;
END PROCESS con1;

ys <= ya + yb;

mux1: PROCESS(ys, rbb, ymsel)
BEGIN
      CASE ymsel IS
            WHEN '0' => ym <= ys;
            WHEN '1' => ym <= rbb;
            WHEN OTHERS => ym <= "XXXXXXXXXXXXXXXXXXXX";
      END CASE;
END PROCESS mux1;

con2: PROCESS(ya2const)
BEGIN
      CASE ya2const IS
            WHEN '0' => ya2 <= "00000000000000000001";
            WHEN '1' => ya2 <= "00000000000000000010";
            WHEN OTHERS => ya2 <= "XXXXXXXXXXXXXXXXXXXX";
      END CASE;
END PROCESS con2;

ys2 <= ya2 + yb2;

yabmux: PROCESS(rbus, yade, yabzerolsb, yabsel)
BEGIN
      CASE v2'(yabzerolsb & yabsel) IS
            WHEN "00" => yab <= rbus;
            WHEN "01" => yab <= yade;
```

33

Rhodes 4-19

```
                WHEN "10" => yab <= rbus AND "11111111111111111110";
                WHEN "11" => yab <= yade AND "11111111111111111110";
                WHEN OTHERS => yab <= "XXXXXXXXXXXXXXXXXXXX";
            END CASE;
    END PROCESS yabmux;

eqcomp: PROCESS(re, rbus)
    BEGIN
            IF(re(19 DOWNTO 1) = rbus(19 DOWNTO 1)) THEN
                eq <= '1';
            ELSE
                eq <= '0';
            END IF;
    END PROCESS eqcomp;

rblsb <= rb(0);
    relsb <= re(0);
    r0lsb <= r0(0);

END behav;
```

Rhodes 4-19

```
LIBRARY ieee;
USE ieee.std_logic_1164.all;

ENTITY aau_tb IS
END;

ARCHITECTURE aau_tb_arch OF aau_tb IS

COMPONENT aau
    PORT(
        yclk: IN std_ulogic;
        r0ldidb: IN std_ulogic;
        r0ldym: IN std_ulogic;
        reldidb: IN std_ulogic;
        rbldidb: IN std_ulogic;
        rbforclsb: IN std_ulogic;
        rtmpldys2: IN std_ulogic;
        rtmpldrbb: IN std_ulogic;
        rtmpldyade: IN std_ulogic;
        ybconst: IN std_ulogic;
        ya2const: IN std_ulogic;
        ymsel: IN std_ulogic;
        yabzerolsb: IN std_ulogic;
        yabsel: IN std_ulogic;
        idb: IN std_logic_vector(19 DOWNTO 0);
        r0lsb: OUT std_ulogic;
        rblsb: OUT std_ulogic;
        relsb: OUT std_ulogic;
        yab: OUT std_ulogic_vector(19 DOWNTO 0);
        eq: OUT std_ulogic
    );
END COMPONENT;

COMPONENT aaucontrol
    PORT(
        r0lsb: IN std_ulogic;
        rblsb: IN std_ulogic;
        relsb: IN std_ulogic;
        yab: IN std_ulogic_vector(19 DOWNTO 0);
        eq: IN std_ulogic;
        yclk: IN std_ulogic;
        reset: IN std_ulogic;
        r0ldidb: IN std_ulogic;
        r0ldym: OUT std_ulogic;
        reldidb: IN std_ulogic;
        rbldidb: IN std_ulogic;
        rbforclsb: OUT std_ulogic;
        rtmpldys2: OUT std_ulogic;
        rtmpldrbb: OUT std_ulogic;
        rtmpldyade: OUT std_ulogic;
        ybconst: OUT std_ulogic;
        ya2const: OUT std_ulogic;
        ymsel: OUT std_ulogic;
```

35

Rhodes 4-19

```
                yabzerolsb: OUT std_ulogic;
                yabsel: OUT std_ulogic
        );
END COMPONENT;

SIGNAL yclk: std_ulogic;
SIGNAL reset: std_ulogic;
SIGNAL r0ldidb: std_ulogic;
SIGNAL r0ldym: std_ulogic;
SIGNAL reldidb: std_ulogic;
SIGNAL rbldidb: std_ulogic;
SIGNAL rbforclsb: std_ulogic;
SIGNAL rtmpldys2: std_ulogic;
SIGNAL rtmpldrbb: std_ulogic;
SIGNAL rtmpldyade: std_ulogic;
SIGNAL ybconst: std_ulogic;
SIGNAL ya2const: std_ulogic;
SIGNAL ymsel: std_ulogic;
SIGNAL yabzerolsb: std_ulogic;
SIGNAL yabsel: std_ulogic;
SIGNAL idb: std_logic_vector(19 DOWNTO 0);
SIGNAL r0lsb: std_ulogic;
SIGNAL rblsb: std_ulogic;
SIGNAL relsb: std_ulogic;
SIGNAL yab: std_ulogic_vector(19 DOWNTO 0);
SIGNAL eq: std_ulogic;

BEGIN aau1: aau PORT MAP(
        yclk => yclk,
        r0ldidb  => r0ldidb,
        r0ldym => r0ldym,
        reldidb => reldidb,
        rbldidb => rbldidb,
        rbforclsb => rbforclsb,
        rtmpldys2 => rtmpldys2,
        rtmpldrbb => rtmpldrbb,
        rtmpldyade => rtmpldyade,
        ybconst => ybconst,
        ya2const => ya2const,
        ymsel => ymsel,
        yabzerolsb => yabzerolsb,
        yabsel => yabsel,
        idb => idb,
        r0lsb => r0lsb,
        rblsb => rblsb,
        relsb => relsb,
        yab => yab,
        eq => eq
);

aauc1: aaucontrol PORT MAP(
```

36

Rhodes 4-19

```
            yclk => yclk,
            reset => reset,
            r0ldidb   => r0ldidb,
            r0ldym => r0ldym,
            reldidb => reldidb,
            rbldidb => rbldidb,
            rbforclsb => rbforclsb,
            rtmpldys2 => rtmpldys2,
            rtmpldrbb => rtmpldrbb,
            rtmpldyade => rtmpldyade,
            ybconst => ybconst,
            ya2const => ya2const,
            ymsel => ymsel,
            yabzerolsb => yabzerolsb,
            yabsel => yabsel,
            r0lsb => r0lsb,
            rblsb => rblsb,
            relsb => relsb,
            yab => yab,
            eq => eq
        );

resetp: PROCESS
        BEGIN
            reset <= '1';
            wait for 20 ns;
            reset <= '0';
            wait;
        END PROCESS resetp;

clkp:PROCESS
        BEGIN
            yclk <= '1';
            wait for 5 ns;
            yclk <= '0';
            wait for 5 ns;
        END PROCESS clkp;

init: PROCESS
        BEGIN
            wait for 25 ns;
            r0ldidb <= '0';
            reldidb <= '0';
            rbldidb <= '0';
            idb <= "00000000000000000000";
            wait for 40 ns;
            r0ldidb <= '0';
            reldidb <= '0';
            rbldidb <= '1';
            idb <= "00000000000000010000";
            wait for 10 ns;
            r0ldidb <= '0';
            reldidb <= '1';
```

Rhodes 4-19

```
rbldidb <= '0';
idb <= "00000000000000010101";
wait for 10 ns;
r0ldidb <= '1';
reldidb <= '0';
rbldidb <= '0';
idb <= "00000000000000010000";
wait for 10 ns;
r0ldidb <= '0';
wait for 100 ns ;
r0ldidb <= '1';
idb <= "00000000000000010001";
wait for 10 ns;
r0ldidb <= '0';
wait for 90 ns;
reldidb <= '1';
idb <= "00000000000000010100";
wait for 10 ns;
reldidb <= '0';
r0ldidb <= '1';
idb <= "00000000000000010000";
wait for 10 ns;
r0ldidb <= '0';
wait for 100 ns;
r0ldidb <= '0';
reldidb <= '0';
rbldidb <= '1';
idb <= "00000000000000010001";
wait for 10 ns;
r0ldidb <= '0';
reldidb <= '1';
rbldidb <= '0';
idb <= "00000000000000010101";
wait for 10 ns;
r0ldidb <= '1';
reldidb <= '0';
rbldidb <= '0';
idb <= "00000000000000010001";
wait for 10 ns;
r0ldidb <= '0';
wait for 90 ns;
r0ldidb <= '0';
reldidb <= '1';
rbldidb <= '0';
idb <= "00000000000000010110";
wait for 10 ns;
r0ldidb <= '1';
reldidb <= '0';
rbldidb <= '0';
idb <= "00000000000000010010";
wait for 10 ns;
r0ldidb <= '0';
wait for 60 ns;
```

Rhodes 4-19

```
        r0ldidb <= '1';
        reldidb <= '0';
        rbldidb <= '0';
        idb <= "00000000000000010001";
        wait for 10 ns;
        r0ldidb <= '0';
        wait;
    END PROCESS init;

END aau_tb_arch;
```

Rhodes 4-19

```
LIBRARY ieee;
USE ieee.std_logic_1164.all;

ENTITY aaucontrol IS
    PORT(
        r0lsb: IN std_ulogic; --lsb of r0 (low=>even, high=>odd)
        rblsb: IN std_ulogic; --lsb of rb (low=>even, high=>odd)
        relsb: IN std_ulogic; --lsb of re (low=>even, high=>odd)
        yab: IN std_ulogic_vector(19 DOWNTO 0);
        eq: IN std_ulogic; --equality comparator output
        yclk: IN std_ulogic;
        reset: IN std_ulogic;
        r0ldidb:    IN    std_ulogic;   --load   r0   from   idb
(initialization)
        r0ldym: OUT std_ulogic; --load r0 from ym bus
        reldidb: IN std_ulogic; --load re from idb
        rbldidb: IN std_ulogic; --load rb from idb
        rbforclsb: OUT std_ulogic; --force lsb of rb to 1
        rtmpldys2: OUT std_ulogic;  --load rtmp from ys2 bus
        rtmpldrbb: OUT std_ulogic;  --load rtmp from rbb bus
        rtmpldys: OUT std_ulogic;  --load rtmp from ys bus
        rtmpldyade: OUT std_ulogic;  --load rtmp from yade bus
        ybconst: OUT std_ulogic;   --yb bus constant (low=>1,
high=>2)
        ya2const:   OUT   std_ulogic;   --ya2  constant   (low=>1,
high=>2)
        ymsel: OUT std_ulogic; --ym mux select
        yabzerolsb: OUT std_ulogic; --force lsb of yab to zero
        yabsel: OUT std_ulogic --yab bus mux select);
END aaucontrol;

ARCHITECTURE behav OF aaucontrol IS
    SIGNAL r0ldymi: std_ulogic;
    SIGNAL rbforclsbi: std_ulogic;
    SIGNAL rtmpldys2i: std_ulogic;
    SIGNAL rtmpldrbbi: std_ulogic;
    SIGNAL rtmpldyadei: std_ulogic;
    SIGNAL ybconsti: std_ulogic;
    SIGNAL ya2consti: std_ulogic;
    SIGNAL ymseli: std_ulogic;
    SIGNAL yabzerolsbi: std_ulogic;
    SIGNAL yabseli: std_ulogic;
    SIGNAL state: std_ulogic_vector(3 DOWNTO 0);

SUBTYPE v2 IS std_ulogic_vector(1 DOWNTO 0);
    SUBTYPE v3 IS std_ulogic_vector(2 DOWNTO 0);
    SUBTYPE v4 IS std_ulogic_vector(3 DOWNTO 0);
    SUBTYPE v5 IS std_ulogic_vector(4 DOWNTO 0);
BEGIN --
--This code below is the state machine for controlling the address
unit.
```

Rhodes 4-19

```
--The state assignment has not been optimized nor reduced in any
way.
--This state machine is written only to confirm the viability of
the
--patent being applied for.
--
--This state machine only depends on the current state and the LSBs
--of r0, re, rb and the equality comparator's output.
--Input r0ldidb is used to initialize the r0 latch and force this
--state machine into state "F" for initializing the rtmp latch.
--
      statep: PROCESS(reset, yclk, rblsb, relsb, r0lsb, eq, r0ldidb,
state)
      BEGIN
        IF(reset = '1') THEN
              state <= "0000";
        ELSIF(rising_edge(yclk)) THEN
          IF(r0ldidb = '1') THEN
                state <= "1111";
          ELSIF(state = "1111") THEN
            IF(rblsb = '0' AND relsb = '1' AND r0lsb = '1') THEN
                      state <= "0001";
            ELSIF(rblsb = '1' AND relsb = '1' AND r0lsb = '1') THEN
                      state <= "0100";
            ELSIF(rblsb = '1' AND relsb = '0' AND r0lsb = '1') THEN
                      state <= "1000";
            ELSE
                      state <= "0000";
            END IF;
          ELSIF(state = "0000" AND rblsb = '0' AND relsb = '1' AND
                r0lsb = '1' AND eq = '1') THEN
                  state <= "0010";
          ELSIF(state = "0000" AND rblsb = '0' AND relsb = '0' AND
                r0lsb = '0' AND eq = '1') THEN
                  state <= "0011";
          ELSIF(state = "0000" AND rblsb = '1' AND relsb = '1' AND
                r0lsb = '1' and eq = '1') THEN
                  state <= "0101";
          ELSIF(state = "0000" AND rblsb = '1' AND relsb = '1' AND
                r0lsb = '0' and eq = '1') THEN
                  state <= "0100";
          ELSIF(state = "0000" AND rblsb = '1' AND relsb = '0' AND
                r0lsb = '0' and eq = '1') THEN
                  state <= "0111";
          ELSIF(state = "0000" AND rblsb = '1' AND relsb = '0' AND
                r0lsb = '1' and eq = '1') THEN
                  state <= "1000";
          ELSIF(state = "0001" AND eq = '0') THEN
                  state <= "0000";
          ELSIF(state = "0001" AND eq = '1') THEN
                  state <= "0010";
          ELSIF(state = "0010") THEN
                  state <= "0001";
```

Rhodes 4-19

```
            ELSIF(state = "0011") THEN
                    state <= "0000";
            ELSIF(state = "0100") THEN
                    state <= "0000";
            ELSIF(state = "0101") THEN
                    state <= "0110";
            ELSIF(state = "0110") THEN
                    state <= "0000";
            ELSIF(state = "0111") THEN
                    state <= "0000";
            ELSIF(state = "1000") THEN
                    state <= "0000";
            END IF;
        END IF;
        END PROCESS statep;

--
--The code below is used to generate the control signals for the
addressing
--unit.  It depends on the state machine above (current state) and
the LSBs
--of r0, rb, re and the comparator output.
--
--This code has not been reduced nor optimized in any way.  It's
sole
--purpose is to prove the viability of the patent being applied
for.
-- outputp: PROCESS(state, rblsb, relsb, r0lsb, eq)
        BEGIN
            IF(state = "1111" OR reset = '1') THEN
                    r0ldymi <= '0';
                    rbforclsbi <= '0';
                    rtmpldys2i <= '0';
                    rtmpldrbbi <= '0';
                    rtmpldyadei <= '1';
                    ybconsti <= '1';
                    ya2consti <= '1';
                    ymseli <= '0';
                    yabzerolsbi <= '0';
                    yabseli <= '1';
            ELSIF(state = "0000") THEN
                    CASE v4'(rblsb & relsb & r0lsb & eq) IS
                            WHEN "0100" =>
                                    r0ldymi <= '1';
                                    rbforclsbi <= '0';
                                    rtmpldys2i <= '1';
                                    rtmpldrbbi <= '0';
                                    rtmpldyadei <= '0';
                                    ybconsti <= '1';
                                    ya2consti <= '1';
                                    ymseli <= '0';
```

Rhodes 4-19

```
            yabzerolsbi <= '0';
            yabseli <= '1';
      WHEN "0101" =>
            r0ldymi <= '1';
            rbforclsbi <= '0';
            rtmpldys2i <= '0';
            rtmpldrbbi <= '1';
            rtmpldyadei <= '0';
            ybconsti <= '1';
            ya2consti <= '1';
            ymseli <= '1';
            yabzerolsbi <= '0';
            yabseli <= '1';
      WHEN "0110" =>
            r0ldymi <= '1';
            rbforclsbi <= '0';
            rtmpldys2i <= '1';
            rtmpldrbbi <= '0';
            rtmpldyadei <= '0';
            ybconsti <= '1';
            ya2consti <= '1';
            ymseli <= '0';
            yabzerolsbi <= '0';
            yabseli <= '0';
      WHEN "0111" =>
            r0ldymi <= '1';
            rbforclsbi <= '0';
            rtmpldys2i <= '1';
            rtmpldrbbi <= '0';
            rtmpldyadei <= '0';
            ybconsti <= '1';
            ya2consti <= '0';
            ymseli <= '0';
            yabzerolsbi <= '0';
            yabseli <= '0';
      WHEN "0000" =>
            r0ldymi <= '1';
            rbforclsbi <= '0';
            rtmpldys2i <= '1';
            rtmpldrbbi <= '0';
            rtmpldyadei <= '0';
            ybconsti <= '1';
            ya2consti <= '1';
            ymseli <= '0';
            yabzerolsbi <= '0';
            yabseli <= '0';
      WHEN "0001" =>
            r0ldymi <= '0';
            rbforclsbi <= '0';
            rtmpldys2i <= '0';
            rtmpldrbbi <= '1';
            rtmpldyadei <= '0';
            ybconsti <= '1';
```

43

Rhodes 4-19

```
            ya2consti <= '1';
            ymseli <= '0';
            yabzerolsbi <= '0';
            yabseli <= '0';
      WHEN "0010" =>
            r0ldymi <= '1';
            rbforclsbi <= '0';
            rtmpldys2i <= '1';
            rtmpldrbbi <= '0';
            rtmpldyadei <= '0';
            ybconsti <= '1';
            ya2consti <= '1';
            ymseli <= '0';
            yabzerolsbi <= '0';
            yabseli <= '0';
      WHEN "0011" =>
            r0ldymi <= '1';
            rbforclsbi <= '0';
            rtmpldys2i <= '0';
            rtmpldrbbi <= '1';
            rtmpldyadei <= '0';
            ybconsti <= '1';
            ya2consti <= '1';
            ymseli <= '1';
            yabzerolsbi <= '0';
            yabseli <= '0';
      WHEN "1110" =>
            r0ldymi <= '1';
            rbforclsbi <= '0';
            rtmpldys2i <= '1';
            rtmpldrbbi <= '0';
            rtmpldyadei <= '0';
            ybconsti <= '1';
            ya2consti <= '1';
            ymseli <= '0';
            yabzerolsbi <= '1';
            yabseli <= '0';
      WHEN "1111" =>
            r0ldymi <= '1';
            rbforclsbi <= '0';
            rtmpldys2i <= '0';
            rtmpldrbbi <= '1';
            rtmpldyadei <= '0';
            ybconsti <= '1';
            ya2consti <= '1';
            ymseli <= '0';
            yabzerolsbi <= '0';
            yabseli <= '0';
      WHEN "1100" =>
            r0ldymi <= '1';
            rbforclsbi <= '0';
            rtmpldys2i <= '1';
            rtmpldrbbi <= '0';
```

44

Rhodes 4-19

```
            rtmpldyadei <= '0';
            ybconsti <= '1';
            ya2consti <= '1';
            ymseli <= '0';
            yabzerolsbi <= '0';
            yabseli <= '0';
       WHEN "1101" =>
            r0ldymi <= '1';
            rbforclsbi <= '0';
            rtmpldys2i <= '0';
            rtmpldrbbi <= '1';
            rtmpldyadei <= '0';
            ybconsti <= '1';
            ya2consti <= '1';
            ymseli <= '1';
            yabzerolsbi <= '0';
            yabseli <= '0';
       WHEN "1000" =>
            r0ldymi <= '1';
            rbforclsbi <= '0';
            rtmpldys2i <= '1';
            rtmpldrbbi <= '0';
            rtmpldyadei <= '0';
            ybconsti <= '1';
            ya2consti <= '1';
            ymseli <= '0';
            yabzerolsbi <= '0';
            yabseli <= '0';
       WHEN "1001" =>
            r0ldymi <= '1';
            rbforclsbi <= '0';
            rtmpldys2i <= '0';
            rtmpldrbbi <= '1';
            rtmpldyadei <= '0';
            ybconsti <= '1';
            ya2consti <= '1';
            ymseli <= '1';
            yabzerolsbi <= '0';
            yabseli <= '0';
       WHEN "1010" =>
            r0ldymi <= '1';
            rbforclsbi <= '0';
            rtmpldys2i <= '1';
            rtmpldrbbi <= '0';
            rtmpldyadei <= '0';
            ybconsti <= '1';
            ya2consti <= '1';
            ymseli <= '0';
            yabzerolsbi <= '0';
            yabseli <= '0';
       WHEN "1011" =>
            r0ldymi <= '1';
            rbforclsbi <= '0';
```

45

Rhodes 4-19

```
                    rtmpldys2i <= '0';
                    rtmpldrbbi <= '1';
                    rtmpldyadei <= '0';
                    ybconsti <= '1';
                    ya2consti <= '1';
                    ymseli <= '1';
                    yabzerolsbi <= '0';
                    yabseli <= '0';
              WHEN OTHERS => NULL;
         END CASE;
   ELSIF(state = "0001") THEN
         r0ldymi <= '0';
         rbforclsbi <= '0';
         rtmpldys2i <= '1';
         rtmpldrbbi <= '0';
         rtmpldyadei <= '0';
         ybconsti <= '1';
         ya2consti <= '0';
         ymseli <= '0';
         yabzerolsbi <= '0';
         yabseli <= '0';
   ELSIF(state = "0010") THEN
         r0ldymi <= '1';
         rbforclsbi <= '1';
         rtmpldys2i <= '0';
         rtmpldrbbi <= '1';
         rtmpldyadei <= '0';
         ybconsti <= '1';
         ya2consti <= '0';
         ymseli <= '1';
         yabzerolsbi <= '1';
         yabseli <= '0';
   ELSIF(state = "0011") THEN
         r0ldymi <= '1';
         rbforclsbi <= '1';
         rtmpldys2i <= '1';
         rtmpldrbbi <= '0';
         rtmpldyadei <= '0';
         ybconsti <= '1';
         ya2consti <= '1';
         ymseli <= '1';
         yabzerolsbi <= '0';
         yabseli <= '0';
   ELSIF(state = "0100") THEN
         r0ldymi <= '0';
         rbforclsbi <= '0';
         rtmpldys2i <= '1';
         rtmpldrbbi <= '0';
         rtmpldyadei <= '0';
         ybconsti <= '1';
         ya2consti <= '1';
         ymseli <= '1';
         yabzerolsbi <= '1';
```

46

Rhodes 4-19

```
            yabseli <= '0';
    ELSIF(state = "0101") THEN
            r0ldymi <= '1';
            rbforclsbi <= '0';
            rtmpldys2i <= '0';
            rtmpldrbbi <= '0';
            rtmpldyadei <= '0';
            ybconsti <= '1';
            ya2consti <= '1';
            ymseli <= '1';
            yabzerolsbi <= '0';
            yabseli <= '0';
    ELSIF(state = "0110") THEN
            r0ldymi <= '1';
            rbforclsbi <= '0';
            rtmpldys2i <= '1';
            rtmpldrbbi <= '0';
            rtmpldyadei <= '0';
            ybconsti <= '0';
            ya2consti <= '0';
            ymseli <= '0';
            yabzerolsbi <= '1';
            yabseli <= '0';
    ELSIF(state = "0111") THEN
            r0ldymi <= '1';
            rbforclsbi <= '0';
            rtmpldys2i <= '1';
            rtmpldrbbi <= '0';
            rtmpldyadei <= '0';
            ybconsti <= '0';
            ya2consti <= '0';
            ymseli <= '0';
            yabzerolsbi <= '0';
            yabseli <= '0';
    ELSIF(state = "1000") THEN
            r0ldymi <= '0';
            rbforclsbi <= '0';
            rtmpldys2i <= '1';
            rtmpldrbbi <= '0';
            rtmpldyadei <= '0';
            ybconsti <= '0';
            ya2consti <= '0';
            ymseli <= '0';
            yabzerolsbi <= '0';
            yabseli <= '0';
    END IF;
END PROCESS outputp;

--
--The code below is a phase delay (latch) of some control signals.
--
    pdelay: PROCESS(yclk, r0ldymi, rbforclsbi, rtmpldys2i,
        rtmpldrbbi, rtmpldyadei, ybconsti, ya2consti,
```

47

Rhodes 4-19

```
            ymseli, yabzerolsbi, yabseli)
    BEGIN
        IF(yclk = '0') THEN
            r0ldym <= r0ldymi;
            rtmpldys2 <= rtmpldys2i;
            rtmpldrbb <= rtmpldrbbi;
            rtmpldyade <= rtmpldyadei;
        END IF;
    END PROCESS pdelay;

--
--The code below is used to delay some control signals 1 cycle via the
--use of edge-triggered flip-flops.
--
    pdelay2: PROCESS(yclk)
    BEGIN
        IF(rising_edge(yclk)) THEN
            yabzerolsb <= yabzerolsbi;
            rbforclsb <= rbforclsbi;
            yabsel <= yabseli;
            ymsel <= ymseli;
            ybconst <= ybconsti;
            ya2const <= ya2consti;
        END IF;
    END PROCESS pdelay2;

END behav;
```

We claim:

1. A apparatus comprising:
a first feedback circuit comprised of:
   a first register having a data input port and a data output port;
   a first phase delay register having a data input port and a data output port;
   a first adder having first and second data input ports and a data output port;
   a first displacement register having a data output port;
   wherein the data output port of the first register is connected to the data input port of the first phase delay register;
   the data output port of the first phase delay register is connected to the first data input port of the first adder;
   the data output port of the first adder is connected to the data input port of the first register;
   the data output port of the first displacement register is connected to the second data input port of the first adder; and
a second feedback circuit comprised of:
   a second register having a data input port and a data output port;
   a second phase delay register having a data input port and a data output port;
   a second adder having first and second data input ports and a data output port;
   a second displacement register having a data output port;
   wherein the data output port of the second register is connected to the data input port of the second phase delay register;
   the data output port of the second phase delay register is connected to the first data input port of the second adder;
   the data output port of the second adder is connected to the data input port of the second register; and
   the data output port of the second displacement register is connected to the second data input port of the second adder;
a control circuit having an input port at least partially connected to the data output port of the first register;
and wherein the control circuit based at least partially on data at the data output port of the first register causes data at the data output port of the first register of the first feedback circuit to be supplied to an address bus during one or more first register cycles and data at the data output port of the second register of the second feedback circuit to be supplied to the address bus during one or more second register cycles and further comprising:
a beginning address register having a data output port;
an ending address register having a data output port;
wherein the data output port of the beginning address register and the data output port of the ending address register are at least partially connected to the input port of the control circuit;
and wherein the control circuit based at least partially on data at the data output port of the first register, data at the data output port of the beginning address register, and data at the data output port of the ending address register causes data at the data output port of the first register of the first feedback circuit to be supplied to an address bus during one or more first register cycles and data at the data output port of the second register of the second feedback circuit to be supplied to the address bus during one or more second register cycles.

2. The apparatus of claim 1 further comprising:
a comparator circuit having first and second data input ports, and a control output port;
the first data input port of the comparator circuit at least partially connected to the data output port of the ending address register;
the second data input port of the comparator circuit at least partially connected to the data output port of the second register;
wherein the input port of the control circuit is connected to the control output port of the comparator circuit;
and the control circuit based at least partially on data at the control output port of the comparator circuit causes data at the data output port of the first register of the first feedback circuit to be supplied to an address bus during one or more first register cycles and data at the data output port of the second register of the second feedback circuit to be supplied to the address bus during one or more second register cycles.

3. The apparatus of claim 1 and further comprising:
wherein the control circuit has an output port;
a first multiplexer having a first data input port, a second data input port, and a data output port, and a control input port connected to the output port of the control circuit;
wherein the first data input port of the first multiplexer is connected to the data output port of the first adder, the second data input port of the first multiplexer is connected to the data output port of the beginning address register, and the data output port of the first multiplexer is connected to the data input port of the first register;
and wherein the control circuit causes the first multiplexer to supply data at its first data input port to the data output port of the first multiplexer during one or more cycles,
and wherein the control circuit causes the first multiplexer to supply data at its second data input port to the data output port of the first multiplexer during one or more cycles.

4. A apparatus comprising:
a first feedback circuit comprised of:
   a first register having a data input port and a data output port;
   a first phase delay register having a data input port and a data output port;
   a first adder having first and second data input ports and a data output port;
   a first displacement register having a data output port;
   wherein the data output port of the first register is connected to the data input port of the first phase delay register;
   the data output port of the first phase delay register is connected to the first data input port of the first adder;
   the data output port of the first adder is connected to the data input port of the first register;
   the data output port of the first displacement register is connected to the second data input port of the first adder; and
a second feedback circuit comprised of:
   a second register having a data input port and a data output port;
   a second phase delay register having a data input port and a data output port;

a second adder having first and second data input ports and a data output port;

a second displacement register having a data output port;

wherein the data output port of the second register is connected to the data input port of the second phase delay register;

the data output port of the second phase delay register is connected to the first data input port of the second adder;

the data output port of the second adder is connected to the data input port of the second register; and the data output port of the second displacement register is connected to the second data input port of the second adder;

a control circuit having an input port at least partially connected to the data output port of the first register;

and wherein the control circuit based at least partially on data at the data output port of the first register causes data at the data output port of the first register of the first feedback circuit to be supplied to an address bus during one or more first register cycles and data at the data output port of the second register of the second feedback circuit to be supplied to the address bus during one or more second register cycles; wherein:

the first displacement register has an input port which is connected to an output port of the control circuit;

wherein the control circuit causes the first displacement register to contain a first value during one or more cycles during which the apparatus provides one or more address signals to the address bus for accessing a first circular memory buffer;

and the control circuit causes the first displacement register to contain a second value during one or more cycles during which the apparatus provides one or more address signals to the address bus for accessing the first circular memory buffer;

and wherein the absolute value of the first value is different from the absolute value of the second value.

5. A apparatus comprising:

a first feedback circuit comprised of:
  a first register having a data input port and a data output port;
  a first phase delay register having a data input port and a data output port;
  a first adder having first and second data input ports and a data output port;
  a first displacement register having a data output port;
  wherein the data output port of the first register is connected to the data input port of the first phase delay register;
  the data output port of the first phase delay register is connected to the first data input port of the first adder;
  the data output port of the first adder is connected to the data input port of the first register;
  the data output port of the first displacement register is connected to the second data input port of the first adder; and a second feedback circuit comprised of:
  a second register having a data input port and a data output port;
  a second phase delay register having a data input port and a data output port;
  a second adder having first and second data input ports and a data output port;
  a second displacement register having a data output port;
  wherein the data output port of the second register is connected to the data input port of the second phase delay register;
  the data output port of the second phase delay register is connected to the first data input port of the second adder;
  the data output port of the second adder is connected to the data input port of the second register; and
  the data output port of the second displacement register is connected to the second data input port of the second adder;

a control circuit having an input port at least partially connected to the data output port of the first register;

and wherein the control circuit based at least partially on data at the data output port of the first register causes data at the data output port of the first register of the first feedback circuit to be supplied to an address bus during one or more first register cycles and data at the data output port of the second register of the second feedback circuit to be supplied to the address bus during one or more second register cycles; wherein:

the second displacement register has an input port which is connected to an output port of the control circuit;

wherein the control circuit causes the second displacement register to contain a first value during one or more cycles during which the apparatus provides one or more address signals to the address bus for accessing a first circular memory buffer;

and the control circuit causes the second displacement register to contain a second value during one or more cycles during which the apparatus provides one or more address signals to the address bus for accessing the first circular memory buffer;

and wherein the absolute value of the first value is different from the absolute value of the second value.

6. The apparatus of claim 1 wherein:

the data output port of the beginning address register is connected to a second data input port of the second register;

the control circuit controls whether data at the data output port of the beginning address register is placed into the second register;

the control circuit controls whether data at the data output port of the second adder is placed into the second register.

7. The apparatus of claim 6 wherein:

the data output port of the first register is connected to a third data input port of the second register;

one or more second register cycles.

8. The apparatus of claim 1 and further comprising:

wherein the control circuit has an output port;

a first multiplexer having a first data input port, a second data input port, and a data output port, and a control input port connected to the output port of the control circuit;

wherein the first data input port of the first multiplexer is connected to the data output port of the first register, the second data input port of the first multiplexer is connected to the data output port of second register, and the data output port of the first multiplexer is connected to the address bus;

and wherein the control circuit causes the first multiplexer to supply data at its first data input port to the data output port of the first multiplexer during one or more cycles, and wherein the control circuit causes the first multiplexer to supply data at its second data input port to the data output port of the first multiplexer during one or more cycles.

9. The apparatus of claim 1 and further wherein:

the control circuit based on a single bit of data at the data output port of the first register causes data at the data output port of the first register of the first feedback circuit to be supplied to an address bus during one or more first register cycles and data at the data output port of the second register of the second feedback circuit to be supplied to the address bus during one or more second register cycles.

10. The apparatus of claim 9 and wherein the single bit of data at the data output port of the first register is the least significant bit.

11. The apparatus of claim 1 and further wherein:

and wherein the control circuit based on a single bit of data at the data output port of the first register, a single bit of data at the data output port of the beginning address register, and a single bit of data at the data output port of the ending address register causes data at the data output port of the first register of the first feedback circuit to be supplied to an address bus during one or more first register cycles and data at the data output port of the second register of the second feedback circuit to be supplied to the address bus during one or more second register cycles.

12. The apparatus of claim 11 and wherein the single bit of data at the data output port of the first register is the least significant bit, the single bit of data at the data output port of the beginning address register is the least significant bit, and the single bit of data at the data output port of the ending address register is the least significant bit.

* * * * *